(12) United States Patent
Kulkarni et al.

(10) Patent No.: US 12,536,027 B1
(45) Date of Patent: Jan. 27, 2026

(54) CONTEXT ENGINE AND INTERPRETER EXECUTING COMPUTER CODE FOR MULTI-TURN INTERACTIONS

(71) Applicant: Dropbox, Inc., San Francisco, CA (US)

(72) Inventors: Ranjitha Gurunath Kulkarni, Sunnyvale, CA (US); Jessica D. Johnson, San Marcos, CA (US); Rajkumar Janakiraman, Sammamish, WA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 19/184,603

(22) Filed: Apr. 21, 2025

(51) Int. Cl.
   *G06F 9/455* (2018.01)
   *G06F 8/30* (2018.01)
   *G06F 8/51* (2018.01)

(52) U.S. Cl.
   CPC ............ *G06F 9/45508* (2013.01); *G06F 8/31* (2013.01); *G06F 8/51* (2013.01)

(58) Field of Classification Search
   CPC ............... G06F 8/31; G06F 8/51; G06F 9/455
   USPC ......................................................... 717/139
   See application file for complete search history.

(56) References Cited

U.S. PATENT DOCUMENTS

| | | |
|---|---|---|
| 5,345,632 A | 9/1994 | Langenaeken et al. |
| 6,778,873 B1 | 8/2004 | Wang et al. |
| 8,359,496 B1 | 1/2013 | Bornstein et al. |
| 9,496,987 B2 | 11/2016 | Naaman et al. |
| 9,503,220 B2 | 11/2016 | Naaman et al. |
| 10,037,707 B2 | 7/2018 | Ashby |
| 2004/0139424 A1* | 7/2004 | Mourachov ......... G06F 9/45504 717/148 |
| 2014/0362858 A1 | 12/2014 | Agarwal et al. |
| 2019/0139433 A1 | 5/2019 | Ashby |
| 2024/0020096 A1* | 1/2024 | Chen ...................... G06F 40/30 |
| 2024/0311549 A1* | 9/2024 | Puri ........................ G06F 40/30 |
| 2025/0117194 A1* | 4/2025 | Johnson .................... G06F 8/35 |
| 2025/0173519 A1* | 5/2025 | Chiang .................. G06F 16/383 |

FOREIGN PATENT DOCUMENTS

| | | |
|---|---|---|
| EP | 2558581 B1 | 6/2018 |
| EP | 3389876 B1 | 9/2019 |

\* cited by examiner

*Primary Examiner* — Wei Y Mui
*Assistant Examiner* — Amir Soltanzadeh
(74) *Attorney, Agent, or Firm* — Keller Preece PLLC

(57) ABSTRACT

The present disclosure relates to systems, non-transitory computer-readable media, and methods for maintaining context during multi-turn interactions. In one or more embodiments, the disclosed systems can detect an interruption event during the execution of computer code by an interpreter that pauses the execution of computer code by the interpreter. The disclosed systems can store, based on the interruption event, a serialized state of the interpreter that indicates a pause location in the computer code by encoding the code execution data. In some cases, the disclosed systems can resume execution of the computer code from the serialized state of the interpreter.

20 Claims, 12 Drawing Sheets

Multi-Turn Context 302

USER: Show all the meetings tomorrow about project bluejay — 304

ASSISTANT:
User: AuthedUser = auth_context.get_current_user()
Contact: Contact = contacts_context.find_contact_by_email(user.email)
Timeblock: TimeBlock = calendar_context.extract_timeblock_from_phrase("tomorrow")
Meetings: list[MeetingInfo] = calendar-context.get_meetings_for_contact_in_timeblock(contact=contact, timeblock, event_summary="project bluejay") — 306

USER: Get me the details of the first one — 308

ASSISTANT: First_meeting: MeetingInfo = meetings[0] — 310

USER: Add [Presto Coalesce](presto@gmail.com) to that meeting — 312

ASSISTANT:
New_attendee_contact: Contact = Contact(email="presto@gmail.com")
Updated_meeting: MeetingInfo = calendar_context.add_attendee_to_meeting(meeting=first_meeting, Contact=new_attendee_contact) — 314

⊕ Add Message

*Fig. 3*

CONTEXT ENGINE AND INTERPRETER EXECUTING COMPUTER CODE FOR MULTI-TURN INTERACTIONS

BACKGROUND

Advancements in computing devices and networking technology have given rise to a variety of innovations in machine learning and computer architecture. For example, local and web-based computing systems have been developed that utilize or implement context management assistants for understanding the context of multi-turn conversations. Some existing systems use context management assistants in conjunction with large language models to generate relevant responses to queries. For example, some existing systems utilize multiple large language models to determine or track the context of multi-turn interactions (or multi-turn conversations). Despite these advances, however, existing context management assistants continue to suffer from a number of disadvantages, particularly in terms of accuracy and efficiency.

As just suggested, certain existing context management assistants are inaccurate. More particularly, some existing systems use context management assistants that attempt to maintain an understanding of multi-turn user interactions but do so by retokenizing the entire conversation with each new turn or query. As a result, while these existing systems gain some level of contextual understanding, the context is imprecise and generalized to the set of queries processed throughout the conversation. Indeed, the contextual understanding of many existing systems is determined and maintained at the large-language-model level which cannot track turn-by-turn progress beyond broad-strokes conversation tokenization.

In addition to their accuracy issues, some existing context management assistants are also inefficient. For example, as a conversation progresses over multiple turns or queries, many existing systems apply a large language model to retokenize the entire conversation at each turn. As the conversation grows, so too does the size and computational expense of tokenizing the entire conversation for a contextual understanding. Performing these increasingly large tokenizations at each turn consumes excessive computational resources, such as processing power and memory, that could otherwise be preserved with a more efficient system. Such computational expense only increases with the application of more complex large language models that may have billions or tens of billions of parameters.

SUMMARY

This disclosure describes one or more embodiments of systems, methods, and non-transitory computer-readable storage media that provide benefits and/or solve one or more of the foregoing and other problems in the art. For instance, the disclosed systems can utilize a multi-turn framework that includes a context engine, an interpreter, and a large language model that operates in conjunction with one another to process queries, generate contextual states, and execute functions for the contextual states. As described herein, the disclosed systems detect an interruption event (e.g., query ambiguity, missing information, coded interruption, or intervening query) that pauses the execution of computer code by the interpreter during a multi-turn conversation. In some cases, the disclosed systems can determine, based on the interruption event, a location (e.g., pause location) in the computer code where the interpreter halts execution of the computer code. In one or more cases, when the interpreter pauses the execution of the computer code, the disclosed systems can serialize the state of the interpreter at the pause location and store the serialized state of the interpreter in a database. In some cases, the disclosed systems can disclosed systems can resume execution of the computer code. For example, if the computer code is missing one or more parameters, the disclosed system can determine supplemental execution data related to the one or more parameters and provide that information to the interpreter. In particular, the disclosed systems can modify the computer code with the supplemental execution data and resume execution of the computer code by executing the modified computer code at the pause location.

BRIEF DESCRIPTION OF THE DRAWINGS

This disclosure will describe one or more example implementations of the systems and methods with additional specificity and detail by referencing the accompanying figures. The following paragraphs briefly describe those figures, in which:

FIG. 3 illustrates the multi-turn interpreter system generating a contextual prompt for multi-turn interactions in accordance with one or more embodiments.

DETAILED DESCRIPTION

This disclosure describes one or more embodiments of a multi-turn interpreter system that can pause and resume the execution of computer code by an interpreter that is purpose-built to run or execute processes defined by computer code generated by a large language model. For example, the multi-turn interpreter system executes computer code utilizing an interpreter integrated (or in communication) with a context engine and a large language model. In one or more cases, the multi-turn interpreter system can encounter an interruption event (e.g., one or more coded interruptions, one or more missing parameters and/or one or more ambiguities) in the text query and/or computer code that pauses execution of the computer code by the interpreter. In such instances, the multi-turn interpreter system can determine and/or store a serialized state of the interpreter that indicates a location where the interpreter paused execution of the computer code. In some embodiments, the multi-turn interpreter system 100 can resume execution of the computer code from the serialized state. For example, in some embodiments, the multi-turn interpreter system can determine additional information (e.g., supplemental execution data) that can resume execution of the computer code by the interpreter. For instance, if the computer code includes a missing parameter, the multi-turn interpreter system can determine supplemental execution data associated with the missing parameter and generate modified computer code with the supplemental execution data. In one or more implementations, the multi-turn interpreter system can resume execution of the computer code by the interpreter by executing the modified computer code at the pause location.

Figure 1:
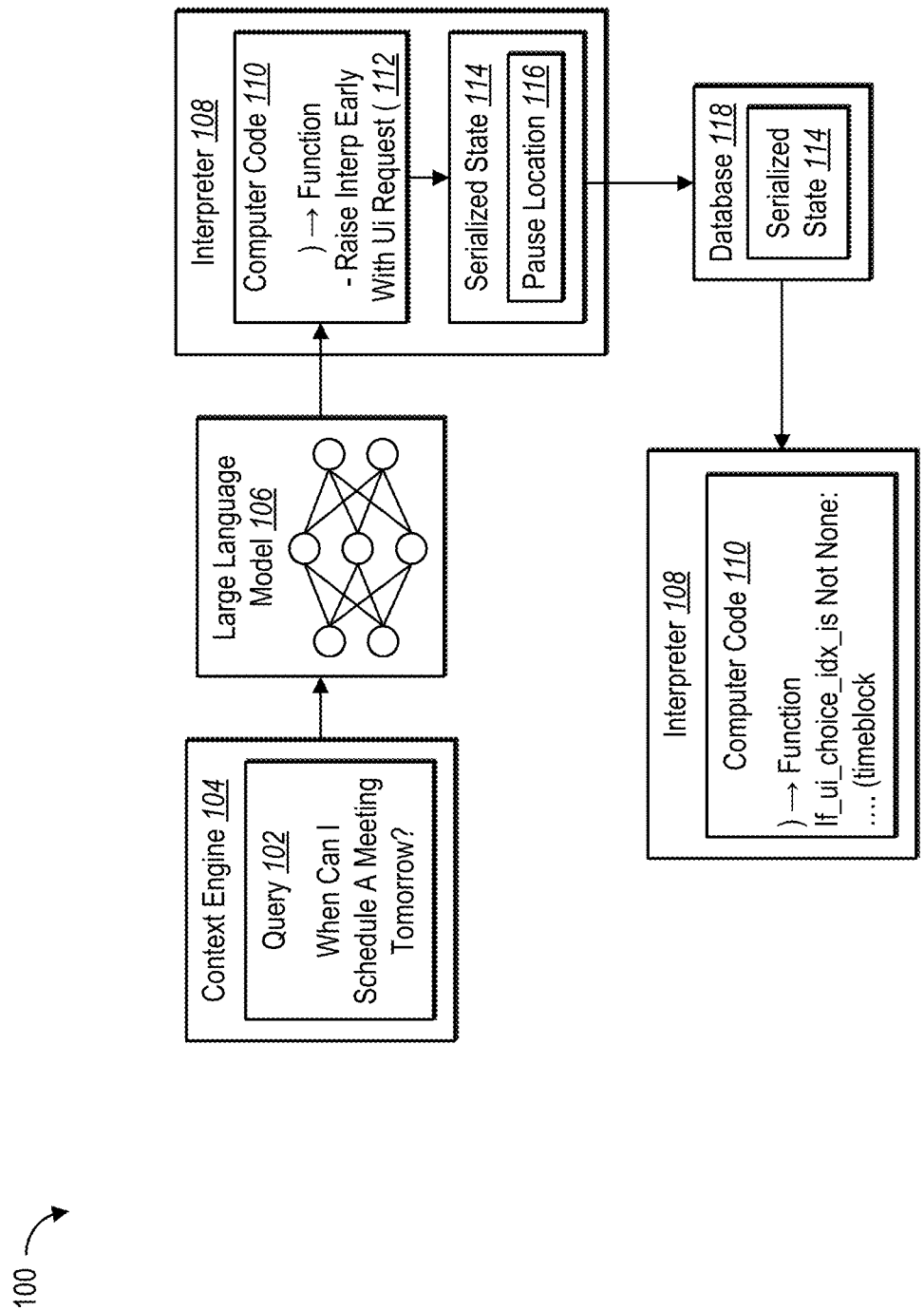
FIG. 1 illustrates an example overview of a multi-turn interpreter system pausing and resuming execution of computer code by an interpreter in accordance with one or more embodiments.

As just mentioned, the multi-turn interpreter system can pause and resume the execution of computer code at a pause location by an interpreter due to an interruption event by modifying the computer code with supplemental execution data. FIG. 1 illustrates an example overview of a multi-turn interpreter system pausing and resuming execution of computer code by an interpreter in accordance with one or more embodiments.

In one or more embodiments, the multi-turn interpreter system 100 can receive a text query 102 from a client device. In some cases, the multi-turn interpreter system 100 can receive the text query 102, where the text query 102 can include ambiguities or missing information. As described in more detail below, in such instances, the text query 102 can utilize multi-turn user interactions to disambiguate and/or determine the missing information in the text query 102. For example, the text query 102 that reads "When can I schedule a meeting tomorrow?" can include missing information about the time, location, and/or participants associated with the meeting.

As shown in FIG. 1, a context engine 104 can process the text query 102 to generate a prompt that provides instructions to a large language model 106 for generating computer code 110 that corresponds to the text query 102. In particular, the prompt can include one or more multi-turn examples along with the text query 102 that instructs the large language model 106 to generate the computer code 110 for the interpreter 108. In some cases, the multi-turn examples can include one or more multi-turn examples (or functions) that serve as building blocks to the large language model 106 for generating the computer code 110. In one or more cases, the multi-turn interpreter system 100 can instruct the interpreter 108 to generate computer code 110 for a muti-turn context.

As shown in FIG. 1, the multi-turn interpreter system 100 can execute the computer code 110 with the interpreter 108. For example, the interpreter 108 can process the computer code 110 and generate an output for the text query 102. As indicated above, and shown in FIG. 1, the interpreter 108 can encounter an interruption event 112 while executing the computer code 110. In particular, the interpreter 108 can encounter the interruption event 112 based on one or more coded interruptions included in the computer code 110, one or more ambiguities (e.g., parameters that are undefined or have multiple possible definitions), missing information within the text query 102 (e.g., resulting in computer code missing one or more parameters), writing operations, and/or an intervening query (e.g., a query received before execution of the computer code generated from the previous query and/or a query that changes the topic or context of the conversation). As mentioned above, the multi-turn interpreter system 100 can receive the text query 102 with one or more ambiguities and/or missing information. Accordingly, the computer code 110 corresponding to the text query 102 can include one or more missing parameters associated with the missing information and/or one or more ambiguities associated with the one or more ambiguities in the text query 102. In one or more embodiments, when the multi-turn interpreter system 100 encounters the ambiguities and/or one or more missing parameters in the computer code 110, the multi-turn interpreter system 100 can raise an exception function associated with the interruption event 112 that pauses execution of the computer code 110 by the interpreter 108 and requests supplemental execution data from the client device. Additionally, in some cases, the multi-turn interpreter system 100 can include a pause function and can later resume the function from a serialized state 114. For example, the multi-turn interpreter system 100 can detect the interruption event 112 that pauses execution of the computer code 110 at the pause location 116 and where the multi-turn interpreter system 100 can later resume execution.

As shown in FIG. 1, once the multi-turn interpreter system 100 pauses execution of the computer code 110, the multi-turn interpreter system 100 can determine a pause location 116 within the computer code 110, indicating which functions, segments, and/or portions of the computer code 110 the interpreter executed (or processed). As shown in FIG. 1, the multi-turn interpreter system 100 can generate a serialized state 114 of the interpreter 108 that encodes execution data (e.g., executed computer code) indicating the pause location 116. In particular, the multi-turn interpreter system 100 can serialize the state of the interpreter 108 by converting the state of the interpreter 108 into a sequence of bits. As shown in FIG. 1, the multi-turn interpreter system 100 can store the serialized state 114 of the interpreter 108 within a database 118. Additionally, in some cases, the multi-turn interpreter system 100 can resume execution of the computer code 110 after generating the serialized state 114 of the interpreter 108. For example, the multi-turn interpreter system 100 can pause execution based on the pause function within the computer code 110 pausing execution for a period of time or until receiving an indication to resume execution, whereupon the multi-turn interpreter system 100 can resume execution of the computer code 110.

In one or more implementations, the multi-turn interpreter system 100 can determine supplemental execution data for resuming the execution of the computer code 110. In particular, the computer code 110 can include one or more functions for determining and/or requesting the supplemental execution data from the client device of a user account associated with the text query 102. For example, the prompt can include one or more multi-turn examples for determining (or requesting) one or more missing parameters (or variables) and/or clarifying one or more ambiguities within the text query 102 and/or the computer code 110.

In one or more cases, based on the interpreter 108 encountering the interruption event 112, the multi-turn interpreter system 100 can trigger a supplemental request that requests clarifying data and/or one or more missing parameters from the client device associated with the user account. For example, the text query 102 that reads "When can I schedule a meeting tomorrow?" includes ambiguities and/or missing information regarding the time, attendees, location, etc., related to the meeting. In one or more cases, the multi-turn interpreter system 100 can generate the supplemental request requesting a time to schedule the meeting. In some cases, the multi-turn interpreter system 100 can generate the supplemental request by generating and providing for display on a graphical user interface of the client device one or more available times (or time blocks) of a schedule of the user account associated with the client device. In one or more cases, the multi-turn interpreter system 100 can determine the supplemental execution data by receiving a selection of a time (or timeblock).

In some cases, the multi-turn interpreter system 100 can determine the supplemental execution data. For example, the multi-turn interpreter system 100 can disable and/or enable multi-turn context for an instance or session with the context engine 104, large language model 106, and the interpreter 108. In some cases, if the multi-turn interpreter system 100 disables a multi-turn context, the multi-turn interpreter system 100 can make one or more assumptions and provide the missing or clarifying information to the interpreter 108 by modifying the computer code with the supplemental execution data.

As further shown in FIG. 1, the multi-turn interpreter system 100 can generate modified computer code by modifying the computer code 110 with the supplemental execution data. In particular, the multi-turn interpreter system 100 can modify the computer code 110 according to the supplemental execution data by adding a parameter (or variable), such as the timeblock parameter, to the computer code 110. Indeed, when the multi-turn interpreter system 100 generates the modified computer code, the multi-turn interpreter system 100 can deserialize the state of the interpreter 108 and resume execution of the computer code 110 according to the modified computer code. As discussed in more detail below, the multi-turn interpreter system 100 can pause and resume execution of the computer code 110 in a multi-turn context.

In some cases, the multi-turn interpreter system 100 can utilize the context engine, large language model, and interpreter to facilitate a group-based multi-turn context for a group-based multi-turn conversation (or interaction). For example, the multi-turn interpreter system 100 can identify one or more user accounts associated with a group. In some cases, the multi-turn interpreter system 100 can monitor and store individual multi-turn contexts for each user account and determine shared themes, topics, and/or tasks of the group within each individual multi-turn context. In some cases, the multi-turn interpreter system 100 can aggregate the individual multi-turn contexts into a group-based multi-turn context to maintain contextual awareness of multiple user accounts performing related tasks. As suggested above, the multi-turn interpreter system 100 can provide several improvements or advantages over existing context management assistants (or agents). For example, the multi-turn interpreter system 100 can provide improved accuracy over many existing context management assistants. While some context management assistants retokenize the entire conversation for each new turn or query, the multi-turn interpreter system 100 employs contextual aware prompts for a large language model as generated by the context engine that include context aware code instructions for performing tasks. In some cases, the multi-turn interpreter system 100 can consistently update and modify the context aware code instructions by appending (or including) instruction code of user interaction history and executed computer code to a prompt that can instruct the large language model to generate computer code in a context aware manner. By utilizing the context aware instruction code (or prompt), the multi-turn interpreter system 100 can maintain precise conversation context for generating accurate and on-topic responses to queries even when queries correspond to different topics or tasks. In some cases, the multi-turn interpreter system 100 maintains the context aware code/prompt and updates the same context aware code/prompt for subsequent queries of a conversation (e.g., by modifying the computer code) without needing to re-process the entire text of each query in the conversation.

As just suggested, in addition to improving upon accuracy of conventional context management assistances, in some embodiments, the multi-turn interpreter system further improves upon efficiency. Unlike conventional context management assistants, which generally include entire text conversations and/or attachments within a prompt to maintain contextual awareness, the multi-turn interpreter system 100 uses code instructions in the prompt which (greatly) reduces tokenized data (and the corresponding computational expense of tokenization) for a large language model. In particular, by utilizing a prompt with code instructions, large language model tokenizes a prompt that is the fraction of the size of prompts tokenized by some existing systems. Accordingly, the prompt can be tokenized much faster and can implement smaller large language models that afford the same or better accuracy and function compared to the much larger models of some existing systems. On top of reduced tokenization costs, the multi-turn interpreter system 100 saves computations resources by reducing number of large language model calls and the number of interactions between the large language model and services or APIs utilized to generate a response to the query.

As illustrated by the foregoing discussion, the present disclosure utilizes a variety of terms to describe features and benefits of the multi-turn interpreter system. Additional detail is hereafter provided regarding the meaning of these terms as used in this disclosure. As used herein, the term "query" includes or refers to data or a specific model output request in the form of input to search for information within a system and/or to generate information using a large language model. In some cases, a query can include digital text and/or other digital content items. A query can include one or more ambiguities or missing information that is needed to generate an accurate response. Moreover, in some instances, the multi-turn interpreter system 100 extracts data from a query. Specifically, the multi-turn interpreter system 100 can extract natural language structured programmatic data from a query or prompt. Thus, in some instances, the multi-turn interpreter system 100 generates computer code (e.g., utilizing the context engine interacting with the large language model) in response to extracting natural language structured programmatic data from a query.

As mentioned above, the multi-turn interpreter system utilizes a context engine. As used herein, the term "context engine" includes or refers to one or more models (e.g., a machine learning model) that work(s) in conjunction with one or more large language models to break down text queries into one or more prompts and to generate computer code from the one or more prompts. For instance, a context engine can determine, based on the query, one or more multi-turn examples to include in the prompt that instruct a large language model to generate computer code for execution by an interpreter. In some embodiments, the multi-turn interpreter system 100 utilizes the context engine (e.g., context engine) as described by Rajkumar Janakiraman in U.S. patent application Ser. No. 18/309,496, titled GENERATING MULTI-ORDER TEXT QUERY RESULTS UTILIZING A CONTEXT ORCHESTRATION ENGINE, filed on Apr. 28, 2023, which is hereby incorporated by reference in its entirety. In one or more implementations, the multi-turn interpreter system 100 utilizes the context engine as described by James Johnson in U.S. patent application Ser. No. 18/482,715, titled CUSTOM INTERPRETER FOR EXECUTING COMPUTER CODE GENERATED BY A LARGE LANGUAGE MODEL, filed on Oct. 6, 2023, which is hereby incorporated by reference in its entirety.

As used herein, the term "interruption event" can include or refer to an event that pauses the execution of computer code by an interpreter. In one or more embodiments, an interruption event can include one or more missing parameters (or variables), ambiguities, and/or writing operations. In some cases, an interruption event can correspond to the multi-turn interpreter system 100 receiving one or more user interactions (or inputs) to resume execution of computer code. In some cases, an interruption event can be a function (e.g., pause function), variable, or coded segment within the computer code that pauses execution of the computer code. For example, the computer code can include a function (or other code segment) that instructs the interpreter to pause execution of the computer code for a specified period of time or until receiving a specified interaction from a client device associated with a user account. In some cases, the user account can define the interruption event.

As used herein, the term "pause location" can include or refer to a location within computer code where an interpreter stops the execution of computer code. In some cases, a pause location can correspond to a location (e.g., a line of code) of an unexecuted or partially executed function within the computer code. For example, in one or more cases, the interpreter can execute a first function in the computer code. If the interpreter pauses the execution of the computer code after the first function, the pause location would be the second (or subsequent) function in the computer code that the interpreter did not execute.

As used herein, the term "supplemental execution data" can include or refer to information or data that resumes the execution of computer code by an interpreter. In one or more cases, the multi-turn interpreter system 100 can determine supplemental execution data based on one or more user interactions (or user messages). For example, as described above, in some embodiments, the multi-turn interpreter system 100 can request clarification data related to an ambiguity in the query and/or computer code from a client device. Based on receiving the clarification data, the multi-turn interpreter system 100 can determine supplemental execution data to include in the computer code to resume (or complete) execution of the computer code.

As mentioned above, the context engine includes or refers to a machine learning model. In one or more embodiments, a "machine learning model" includes a computer algorithm or a collection of computer algorithms that can be trained and/or tuned based on inputs to approximate unknown functions. For example, a machine learning model can include a computer algorithm with branches, weights, or parameters that changed based on training data to improve for a particular task. Thus, a machine learning model can utilize one or more learning techniques to improve in accuracy and/or effectiveness. Example machine learning models include various types of decision trees, support vector machines, Bayesian networks, random forest models, or neural networks (e.g., deep neural networks).

Similarly, a "neural network" includes a machine learning model of interconnected artificial neurons (e.g., organized in layers) that communicate and learn to approximate complex functions and generate outputs based on a plurality of inputs provided to the model. In some instances, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a transformer neural network, a generative adversarial neural network, a graph neural network, a diffusion neural network, or a multi-layer perceptron. In some embodiments, a neural network includes a combination of neural networks or neural network components. Upon training, a neural network can become a large language model.

Along these lines, the multi-turn interpreter system 100 utilizes the context engine to interact with a large language model. As used herein, the term "large language model" includes or refers to one or more neural networks capable of processing natural language text to generate outputs that range from predictive outputs, analyses, or combinations of data within stored content items. In particular, a large language model can include parameters trained (e.g., via deep learning) on large amounts of data to learn patterns and rules of language for summarizing and/or generating digital content. Examples of a large language model include BLOOM, Bard AI, ChatGPT, LaMDA, DialoGPT, DropboxGPT, and Dropbox FileGPT.

As mentioned above, the multi-turn interpreter system 100 utilizes an interpreter to run computer code generated by a large language model. As used herein, the term "interpreter" includes or refers to a software or application program that reads and executes computer code (e.g., source code) written in a high-level programming language. For instance, the interpreter can read computer code line by line, statement by statement, or instruction by instruction and can execute the code without converting it into machine code. In some cases, an interpreter can also or alternatively translate the computer code into machine code or another representation. Moreover, in some instances, the interpreter does not utilize a separate compilation step to run computer code.

Relatedly, as used herein, the term "serialized state" includes or refers to a standardized data format of a state of an agent, such as, an interpreter. In particular, a serialized state can reflect variables, objects, attributes, and/or parameters within computer code and/or executed computer code by an agent in a platform-agnostic (or independent) format.

Figure 2:
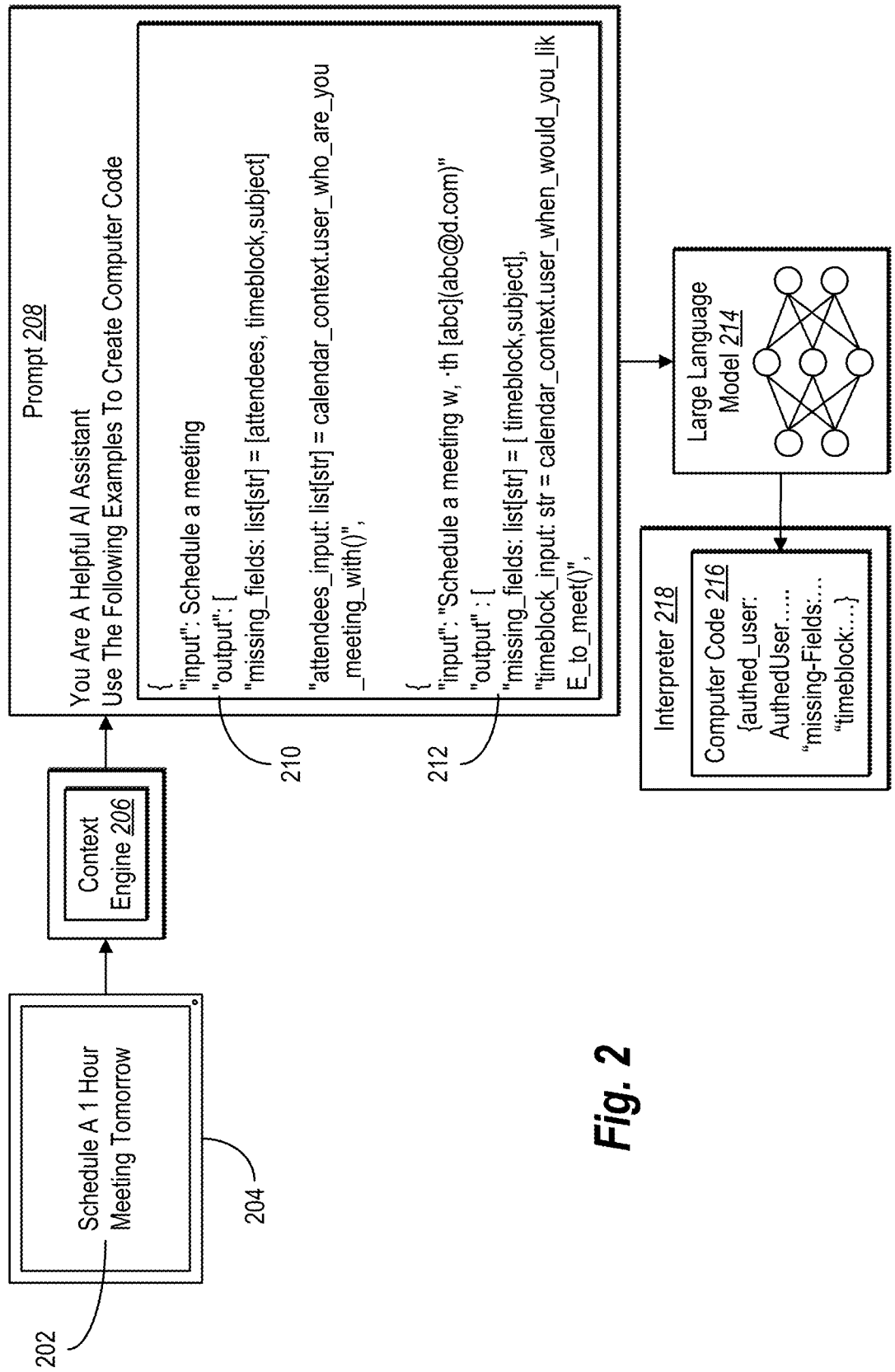
FIG. 2 illustrates a multi-turn interpreter system generating computer code utilizing a context engine and a large language model in accordance with one or more embodiments.

As mentioned above, the multi-turn interpreter system 100 utilizes a context engine and large language model to generate computer code for an interpreter to execute. FIG. 2 illustrates the multi-turn interpreter system 100 generating computer code utilizing a context engine and a large language model in accordance with one or more embodiments.

For example, FIG. 2 shows the multi-turn interpreter system 100 receiving a text query 202 from a client device 204 (e.g., via an interface for interacting with a large language model 214). As shown, the text query 202 in FIG. 2 reads, "Schedule a 1 hour meeting tomorrow." In one or more embodiments, the text query 202 can include one or more ambiguities and/or missing information that the multi-turn interpreter system 100 needs to execute computer code with an interpreter 218 and generate a response to the text query 202.

Furthermore, FIG. 2 shows the context engine 206 generating a prompt 208 corresponding to the text query 202. In one or more embodiments, the context engine 206 can analyze the text query 202 and generate the prompt 208 comprising instructions for a large language model 214 on how to generate computer code 216 for the interpreter 218. In some cases, the prompt 208 can include one or more multi-turn examples 210, 212 that the large language model 214 can use to generate the computer code 216. For example, as shown in FIG. 2, based on the context engine 206 analyzing the meaning (or intent) of the text query 202, the multi-turn interpreter system 100, via the context engine 206, can select a first multi-turn example 210 and a second multi-turn example 212.

In one or more embodiments, the large language model 214 can follow the first multi-turn example 210 and the second multi-turn example 212 to generate the computer code 216. In some cases, the large language model 214 can use the first multi-turn example 210 and the second multi-turn example 212 as functions (or building blocks) so that the large language model 214 can generate the computer code 216 for generating a response to the text query 202. In one or more implementations, the multi-turn interpreter system 100 utilizes the one or more functions as building blocks as described by Rajkumar Janakiraman in U.S. patent application Ser. No. 19/057,835, titled GENERATING RESPONSES USING A CONTEXT ENGINE COUPLED WITH A LOGIC ENGINE AND TIME PHRASE RESOLUTION, filed on Feb. 19, 2025, which is hereby incorporated by reference in its entirety.

As shown in FIG. 2, in one or more embodiments, the one or more multi-turn examples 210, 212 can inform the large language model 214 on how to request clarification data, missing information, or request one or more user interactions associated with a writing operation in a multi-turn context. For example, the first multi-turn example 210 can outline how the large language model 214 should schedule a meeting when the text query 202 is missing information (e.g., one or more variables) such as, but not limited to, the attendees, the timeblock, and the subject. As shown in FIG. 2, the first multi-turn example 210 can include an example of a function on how the interpreter 218, in conjunction with the large language model 214 and the context engine 206 can determine the attendees for the meeting by generating and providing for display a context assistant message (e.g., a supplemental request) on a graphical user interface of the client device 204.

Additionally, as FIG. 2 shows, the second multi-turn example 212 can instruct the large language model 214 on how to schedule a meeting when the text query 202 includes attendees. As FIG. 2 indicates, the second multi-turn example 212 can instruct the large language model 214 on how to generate computer code 216 that when executed by the interpreter 218 can determine one or more missing variables (e.g., timeblock and subject) of the meeting. In one or more cases, the multi-turn interpreter system 100 can utilize one or more multi-turn examples (or functions) to find out details about the topic of the text query 202 (e.g., the meeting) in a multi-turn context.

In one or more embodiments, the multi-turn interpreter system 100 can select the one or more multi-turn examples and/or prior user interactions (e.g., queries, clarification information, selections, etc.) according to a sliding window (or window algorithm). For example, the multi-turn interpreter system 100 can store prior multi-turn interactions for days, weeks, months, or years in a database. In some cases, the multi-turn interpreter system 100 can pull relevant information related to a query in a later or subsequent multi-turn conversation to include in the prompt 208.

In one or more cases, the multi-turn interpreter system 100 can modify the prompt 208 to maintain a contextual understanding of a multi-turn conversation (or interactions). In particular, as the multi-turn interpreter system 100 receives one or more user interactions (e.g., queries) from the client device 204, the multi-turn interpreter system 100 can modify one or more multi-turn examples (or functions) that correspond to the topic or theme of the subsequent queries and add previous queries to the modified (or additional) prompt along with the computer code (or multi-turn examples) corresponding to the previous query. As discussed in more detail below in FIG. 3, the multi-turn interpreter system 100 can generate a contextual prompt for multi-turn interactions comprising multiple text queries and multiple multi-turn examples for a multi-turn conversation.

In one or more embodiments, the prompt 208 can also include computer code instructions for performing one or more tasks, such as, retrieving one or more content items related to the text query 202. For example, based on the instructions in the prompt 208, the large language model 214 can generate computer code 216 for retrieving information related to a calendar of a user account associated with the client device 204. Indeed, the prompt 208 can include any number of examples (or functions) for performing specific tasks such as retrieving one or more content items and requesting clarifying or missing information in a multi-turn context.

As shown in FIG. 2, the multi-turn interpreter system 100 can generate the computer code 216 for execution by the interpreter 218. In one or more cases, the multi-turn interpreter system 100 can generate computer code 216 that corresponds to different subcomponents (e.g., intents) of the text query 202 as described in U.S. patent application Ser. No. 18/309,496 (incorporated above). As described in U.S. patent application Ser. No. 18/482,715 (incorporated above), in some embodiments, the computer code 216 includes a set of instructions written in a programming language that a computing device (e.g., interpreter 218) can interpret and execute to perform a specific task. In particular, the computer code 216 includes a series of statements and functions that execute specific operations. Further, the computer code 216 can include statements written in specific syntax and be translatable into machine code to be executed by a computing device. In one or more cases, the multi-turn interpreter system 100 generates the computer code 216 for a subcomponent (e.g., intent) from the text query 202 or for the entire text query 202.

As mentioned above, the multi-turn interpreter system 100 can add one or more multi-turn examples, one or more user interactions, and computer code associated with the one or more user interactions to a prompt to capture the context of multi-turn interactions (or conversations). FIG. 3 illustrates the multi-turn interpreter system 100 generating a contextual prompt for multi-turn interactions in accordance with one or more embodiments.

As shown in FIG. 3, the multi-turn interpreter system 100 can generate (or maintain) a multi-turn context 302 for one or more multi-turn interactions 300. In particular, the multi-turn interpreter system 100 can utilize continuation domain-specific language (DSL) instructions to determine the multi-turn context 302 of one or more multi-turn interactions 300.

For example, as shown in FIG. 3, the multi-turn interpreter system 100 can receive multiple queries from a client device associated with a user account. In particular, the multi-turn interpreter system 100 can receive a first query 304 (or first user message) as a first user interaction from a client device associated with a user account of the client device. As discussed above, the multi-turn interpreter system 100 can generate a first prompt 306 with one or more multi-turn examples associated with the theme, topic, and/or task of the first query 304. For example, in response to the first query 304 which, reads, "Show all the meetings tomorrow about Project Bluejay," the multi-turn interpreter system 100 can generate the first prompt 306 with the multiple multi-turn examples (or functions) for generating a response that shows all the meetings tomorrow regarding Project Bluejay.

As further shown in FIG. 3, the multi-turn interpreter system 100 can receive a second query 308 "get me details of the first one" about the first meeting about Project Bluejay. Accordingly, the multi-turn interpreter system 100 can generate a second prompt 310 with a multi-turn example (or function) for retrieving information about the first meeting about Project Bluejay. In one or more embodiments, the multi-turn interpreter system 100 can append the first query 304 and the first prompt 306 to the second prompt 310. In one or more cases, when the large language model processes the second prompt 310, the large language model can generate computer code that includes the data of the first query 304, first prompt 306, the second query 308, and the second prompt 310 while executing the computer code informed by the second prompt 310 for generating a response (or performing a task) for the second query 308.

As shown in FIG. 3, the multi-turn interpreter system 100 can receive a third query 312 "Add [Presto Coalesce] (presto@gmail.com) to that meeting" and generate a third prompt 314 comprising one or more multi-turn examples (or functions) for adding Presto to the meeting. As shown in FIG. 3, the multi-turn interpreter system 100 can append the data from the first query 304, the first prompt 306, the second query 308, and the second prompt 310 along with the third query 312 to the third prompt 314. Thus, the multi-turn interpreter system 100 can maintain the multi-turn context 302 of the multi-turn interactions 300 and add Presto Coalesce to the first meeting about Project Bluejay tomorrow.

In one or more embodiments, by appending the first query 304, the first prompt 306, the second query 308, and the second prompt 310 to the third prompt 314, the multi-turn interpreter system 100 can recognize that the interpreter has executed the code associated with the first query 304 and/or first prompt 306 and the second query 308 and/or second prompt 310, and instruct the large language model to generate computer code associated with the third prompt 314 based on the multi-turn context 302. Thus, the multi-turn interpreter system 100 can generate a response and/or perform a task more accurately based on the multi-turn context 302 and executions (or actions) of the computer code by the interpreter.

Figure 4:
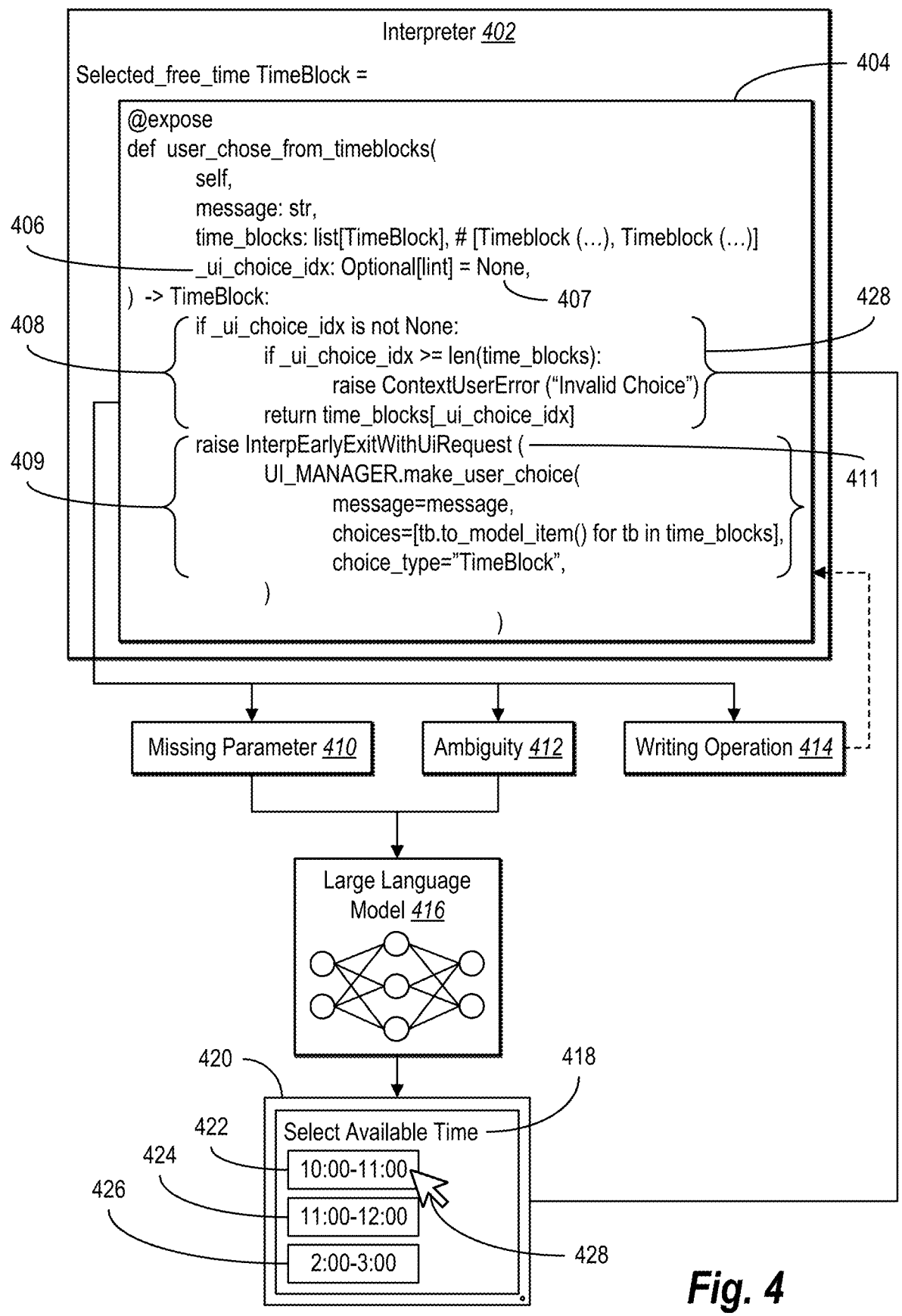
FIG. 4 illustrates an example diagram of the multi-turn interpreter system pausing execution of computer code due to an interruption event in accordance with one or more embodiments.

As discussed above, the multi-turn interpreter system 100 can detect an interruption event that causes the multi-turn interpreter system 100 to pause the execution of computer code by an interpreter. FIG. 4 illustrates an example diagram of the multi-turn interpreter system 100 pausing execution of computer code due to an interruption event in accordance with one or more embodiments.

As described above, the multi-turn interpreter system 100 can generate computer code 404 based on a prompt that corresponds to a query (or text query). Moreover, as previously mentioned, an interpreter 402 can execute the computer code 404 to perform a task or generate a response to the query. As shown in FIG. 4, the multi-turn interpreter system 100 can generate the computer code 404 for scheduling a meeting. As FIG. 4 illustrates, the computer code 404 can include one or more portions, functions, subcomponents, and/or parameters (or variables) for scheduling the meeting. In particular, the computer code 404 can include functions, parameters etc. for determining a block of time (or timeblock) to schedule a meeting.

As indicated above, multi-turn interpreter system 100 can generate, based on the information provided in the query, computer code 404 that includes a missing parameter 410 (or variable), an ambiguity 412, and/or a writing operation 414 that needs user confirmation. For example, the writing operation 414 can correspond to a query requesting cancelation of a meeting. In some cases, canceling the meeting can include performing a writing operation (e.g., deleting the meeting) in a third-party application. In some cases, the multi-turn interpreter system 100 detects an interruption event in the computer code 404 that pauses the interpreter 402 from executing the computer code 404 by the interpreter 402 encountering the missing parameter 410, the ambiguity 412, or the writing operation 414. Accordingly, the missing parameter 410, the ambiguity 412, or the writing operation 414 prevents the interpreter 402 from completing the execution of the computer code 404.

In some cases, the multi-turn interpreter system 100 can represent the missing parameter 410, the ambiguity 412, or the writing operation 414 as a default variable within a function (or portion) of the computer code 404. For example, if the computer code 404 does not specify between two meetings about the same subject, the multi-turn interpreter system 100 can include a default parameter 407 that represents the ambiguity 412. As shown in FIG. 4, because the query and computer code 404 do not specify a timeblock for scheduling the meeting, the computer code 404 can include a default parameter 407 that representing the missing parameter (e.g., missing timeblock parameter). Likewise, the computer code 404 can include a default parameter that represents receiving user confirmation for performing the writing operation 414.

As just indicated, the multi-turn interpreter system 100 can identify or detect the interruption event based on the interpreter 402 encountering a default parameter 407 (or variable) for a function within the computer code 404. In one or more cases, the default parameter 407 can indicate that the multi-turn interpreter system 100 needs to determine and/or request supplemental execution data from a client device associated with a user account to provide information related to the missing parameter 410, clarify the ambiguity 412, or confirm the writing operation 414.

For example, as shown in FIG. 4, the computer code 404 can include one or more functions and/or one or more parameters for determining a timeblock to schedule the meeting. As FIG. 4 illustrates, the computer code 404 can include a timeblock function to select a timeblock to schedule the meeting. Relatedly, the computer code 404 can include one or more functions that, when executed by the interpreter, access the calendar of the user account and determine (or pull) one or more timeblocks where the user is available for the meeting. Because the multi-turn interpreter system 100 does not know which timeblock to select for the meeting, the multi-turn interpreter system 100 can determine the timeblock (or supplementary execution information) by including a default parameter 407 in the computer code 404 that causes the multi-turn interpreter system 100 to request data related to the missing parameter 410, clarifying data related to the ambiguity 412, or user interaction data confirming the writing operation 414.

As just mentioned, the computer code 404 can include a default parameter 407. In some cases, the default parameter 407 can correspond to a user choice index 406 (or user choice function) within the computer code 404. In some implementations, the user choice index 406 can show that the multi-turn interpreter system 100 received data related to the missing parameter 410, clarification data related to the ambiguity 412, or confirmation for a writing operation from a client device associated with the user account.

As shown in FIG. 4, the computer code 404 does not include a timeblock parameter (or variable) for the user choice index 406. Based on the missing timeblock parameter, the multi-turn interpreter system 100 can set the parameter of the user choice index 406 to a default parameter 407 (or variable). For instance, the user choice index 406 has a default parameter 407 of "NONE" because the multi-turn interpreter system 100 has not received a user interaction or selection about the timeblock parameter for the meeting.

As shown in FIG. 4, if the multi-turn interpreter system 100 detects the default parameter 407 within the user choice index 406, the multi-turn interpreter system 100 can skip a first portion 408 of the computer code 404 and jump to a second portion 409 of the computer code 404. When the interpreter 402 encounters the second portion 409, the interpreter 402 pauses the execution of the computer code 404. In one or more cases, the second portion 409 of the computer code 404 can include an exception function 411 that the multi-turn interpreter system 100 raises outside of the interpreter 402 to freeze and serialize a state of the interpreter. In one or more cases, when the multi-turn interpreter system 100 raises the exception function 411 and pauses execution of the computer code 404, the multi-turn interpreter system 100 utilizes a large language model 416 to generate a supplemental request 418 to provide for display on a graphical user interface of client device 420 requesting data related to the missing parameter 410. For example, as shown in FIG. 4, the multi-turn interpreter system 100 can provide for display on the client device 420 the supplemental request 418 comprising one or more selectable elements corresponding to available timeblocks 422, 424, 426 taken from the calendar of the user account for scheduling the meeting.

As shown in FIG. 4, the multi-turn interpreter system 100 can receive a selection 428 of the selectable element corresponding to the first timeblock 422 from the client device 420. Subsequently, in one or more embodiments, the multi-turn interpreter system 100 can generate supplementary execution data based on the selection 428 of the first timeblock 422. For instance, the supplementary execution data can be a concrete value, string of values, and/or characters that the multi-turn interpreter system 100 can add to the computer code 404. Accordingly, the multi-turn interpreter system 100 can generate the supplementary execution data by generating a value for the timeblock parameter (or variable) indicating the selection of the first timeblock 422. As further shown in FIG. 4, the multi-turn interpreter system 100 can modify the computer code 404 by replacing the default parameter 407 with the timeblock parameter associated with the first timeblock 422. Additionally, in one or more cases, the interruption event can correspond to a pause function within the computer code 404. For example, the multi-turn interpreter system 100 can generate a prompt comprising one or more pause example functions that instruct the large language model 416 to generate computer code 404 with a pause function. In one or more embodiments, the pause function can pause execution of the computer code 404 for a specified period of time or until a different event occurs. For example, the multi-turn interpreter system 100 can pause execution of the computer code 404 by the interpreter for 10 minutes. To further illustrate, the pause function can cause the interpreter 402 to pause execution of the computer code 404 until the multi-turn interpreter system 100 receives one or more user interactions from one or more user accounts. To further illustrate, in some cases, the computer code 404 can cause the multi-turn interpreter system 100 via the interpreter 402 to schedule five meetings for a user account. In some cases, the computer code 404 can include a pause function that pauses execution of the computer code 504 for scheduling each meeting until receiving user interaction confirming each meeting. In some cases, the pause function can pause execution of the computer code 404 until another event occurs, such as the generation of a given report or completion of a project. In one or more cases, the multi-turn interpreter system 100 can receive one or more user interactions defining the event, period of time, and/or user interactions associated with the pause function.

Figure 5:
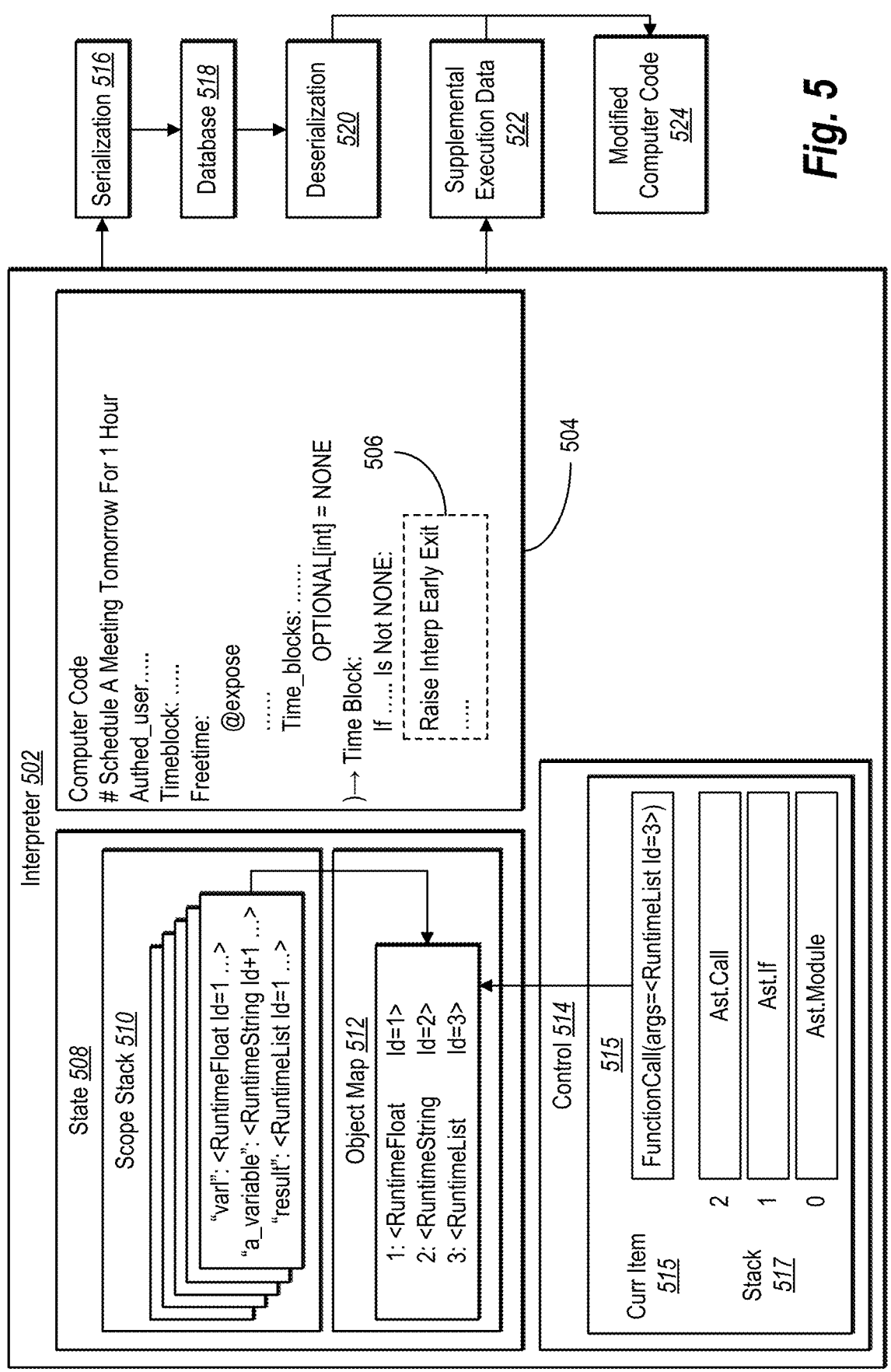
FIG. 5 illustrates an example diagram for the multi-turn interpreter system generating a serialized state of an interpreter in accordance with one or more embodiments.

As mentioned above, the multi-turn interpreter system 100 can pause the execution of computer code by an interpreter and serialize a state of the interpreter. FIG. 5 illustrates an example diagram for the multi-turn interpreter system generating a serialized state of an interpreter in accordance with one or more embodiments. As shown in FIG. 5, an interpreter 502 can execute computer code 504. As described above, the multi-turn interpreter system 100 can pause execution of the computer code 504 by the interpreter 502 based on detecting an interruption event 506 (e.g., user choice index).

As described above, in some cases, when the multi-turn interpreter system 100 detects the interruption event 506, the multi-turn interpreter system 100 can pause execution of the computer come 504 and serialize a state 508 of the interpreter 502. As indicated in FIG. 5, the architecture of the interpreter 502 can comprise two components, the state 508 and the control 514. In some embodiments, the state 508 of the interpreter 502 includes a scope stack 510 that tracks the variables (or names) defined within each scope. For example, the scope at the bottom of the scope stack 510 includes global variables. Additionally, in one or more cases, the state 508 of the interpreter 502 includes an object map 512 that tracks all of the variables, objects (e.g., runtime objects), attributes, parameters, etc. that are used in the interpreter 502 during execution of the computer code 504.

As shown in FIG. 5, the interpreter 502 can include the control 514. In some cases, the control 514 is how the multi-turn interpreter system 100 and more specifically, the interpreter 502, keeps track of the processing (e.g., execution) of the computer code 504. For example, as shown in FIG. 5, the control 514 indicates that the interpreter 502 is currently processing item (or function 515). As further illustrated in FIG. 5, the control 514 can include a stack 517 that tracks the order of execution of functions within the computer code 504 by the interpreter 502. In some cases, the multi-turn interpreter system 100 utilizes one or more executors to push and pop functions (or items) onto the stack 517. An example of the one or more executors can be found in U.S. patent application Ser. No. 18/482,715, (incorporated above). Additionally, the stack 517 can maintain information about each function. In some embodiments, the stack 517 works on a last-in, first-out basis. Thus, the stack 517 oversees high-level functions run by the interpreter 502.

As shown by FIG. 5 and discussed above, when the multi-turn interpreter system 100 pauses the execution of the interpreter 502 at a pause location by raising the execution function, the multi-turn interpreter system 100 can perform an act of serialization 516 on the state 508 of the interpreter 502. In some cases, generating a serialized state 508 of the interpreter 502 can include the multi-turn interpreter system 100 serializing the scope stack 510, the object map 512, and the control 514. In one or more embodiments, the multi-turn interpreter system 100 can serialize the scope stack 510, the object map 512, and the control 514, by converting and/or translating the format and/or structure of the scope stack 510, the object map 512, and the control 514 into a format that can be stored, transmitted and/or reconstructed (e.g., deserialized) at a later time. For example, the multi-turn interpreter system 100 can utilize protocol buffers (protobufs) to translate the structure of the state 508 of the interpreter 502 into a binary format (e.g., sequence of bits). Alternatively, the multi-turn interpreter system 100 can utilize other serialization formats such as, but not limited to, JSON, XML, CSV, YAML, etc., to serialize the state 508 of the interpreter 502.

As indicated above, the multi-turn interpreter system 100 can serialize the functions, variables, parameters, etc., of the computer code 504 by serializing the scope stack 510, the object map 512, and the control 514. In one or more implementations, the runtime of the interpreter 502 is serialized. Indeed, the multi-turn interpreter system 100 can track and identify the exact point (e.g., pause location) within the computer code where the interpreter 502 stopped executing the computer code 504.

In one or more embodiments, the serialization 516 of the state 508 of the interpreter 502 can include generating a data object that defines the pause location in the computer code. In some cases, the data object can reflect where the scope stack 510, the object map 512, and the control 514 indicate the pause location in the computer code 504. Additionally, in some cases, the multi-turn interpreter system 100 can generate a computer code segment that indicates the interruption event and the pause location in the computer code 504. In particular, the multi-turn interpreter system 100 can utilize the scope stack 510, the object map 512, and the control 514 at the time and/or location of the interruption event 506 to generate a computer code segment that reflects the pause location within computer code 504. For example, the computer code segment can have a binary format indicating the location of the last processed function (or item) in the computer code 504.

In one or more embodiments, the query does not include one or more missing parameters and/or ambiguities. In such cases, the multi-turn interpreter system 100 can serialize the state 508 of the interpreter 502 for a turn associated with the query within the multi-turn interaction (or conversation). For example, after processing computer code that does not include an ambiguity and/or missing parameter, the multi-turn interpreter system 100 can serialize the state 508 of the interpreter 502 after processing the computer code 504 associated with a first turn within a multi-turn interaction. As described above, in some cases, the multi-turn interpreter system 100 can include one or more pause functions within the computer code 504. Indeed, the strongly typed data structure of the state 508 of the interpreter 502 allows the system to serialize the state 508 of the interpreter 502 and prevent information loss at any turn within multi-turn interactions (or conversations).

As shown in FIG. 5, the multi-turn interpreter system 100 can store the serialized state 508 of the interpreter 502 in a database 518. In one or more embodiments, the serialized state 508 of the interpreter 502 is not stored long-term. In particular, the multi-turn interpreter system 100 can define the time to live (TTL) of the serialized state 508 within the database 518.

As indicated in FIG. 5, once the multi-turn interpreter system 100 pauses execution of the computer code 504 by the 502 and raises the exception function, the multi-turn interpreter system 100 can assign a session identification to the supplemental request for clarification data, data related to one or more missing parameters, or user confirmation data for a writing operation. In one or more cases, when the multi-turn interpreter system 100 can use the session identification to save the serialized state 508 of the interpreter 502 in the database 518. In one or more cases, the multi-turn interpreter system 100 uses the serial identification to reload the state 508 of the interpreter 502. For example, as discussed above, the multi-turn interpreter system 100 can determine supplemental execution data 522 by requesting clarification data, user confirmation of a writing operation on a third-party application, etc., from a client device associated with a user account. In one or more cases, when the multi-turn interpreter system 100 receives the clarification data, the multi-turn interpreter system 100 sends the received clarification data and the session identification to an API. Additionally, if the session identification is present, the saved serialized state 508 of the interpreter 502 is deserialized (e.g., the multi-turn interpreter system 100 performs an act of deserialization 520 by converting the serialized state 508 of the interpreter 502 back to format utilized in the interpreter 502) and reloaded by the multi-turn interpreter system 100 by rewinding the execution of the computer code 504 back to the start of the most recent function in the stack 517, or in other words, the last executed function in the computer code 504 and replacing the default parameter with the parameter (e.g., clarification data) corresponding to the supplemental execution data 522. Thus, the multi-turn interpreter system 100 can generate a modified state 508 of the interpreter 502 and/or modified computer code 524 by modifying the computer code with the supplemental execution data 522.

In one or more cases, once the multi-turn interpreter system 100 generates the modified state 508 of the interpreter 502, the multi-turn interpreter system 100 can instruct the interpreter 502 to continue executing the modified computer code 524 to generate a response and/or perform a task related to the query.

Figure 6:
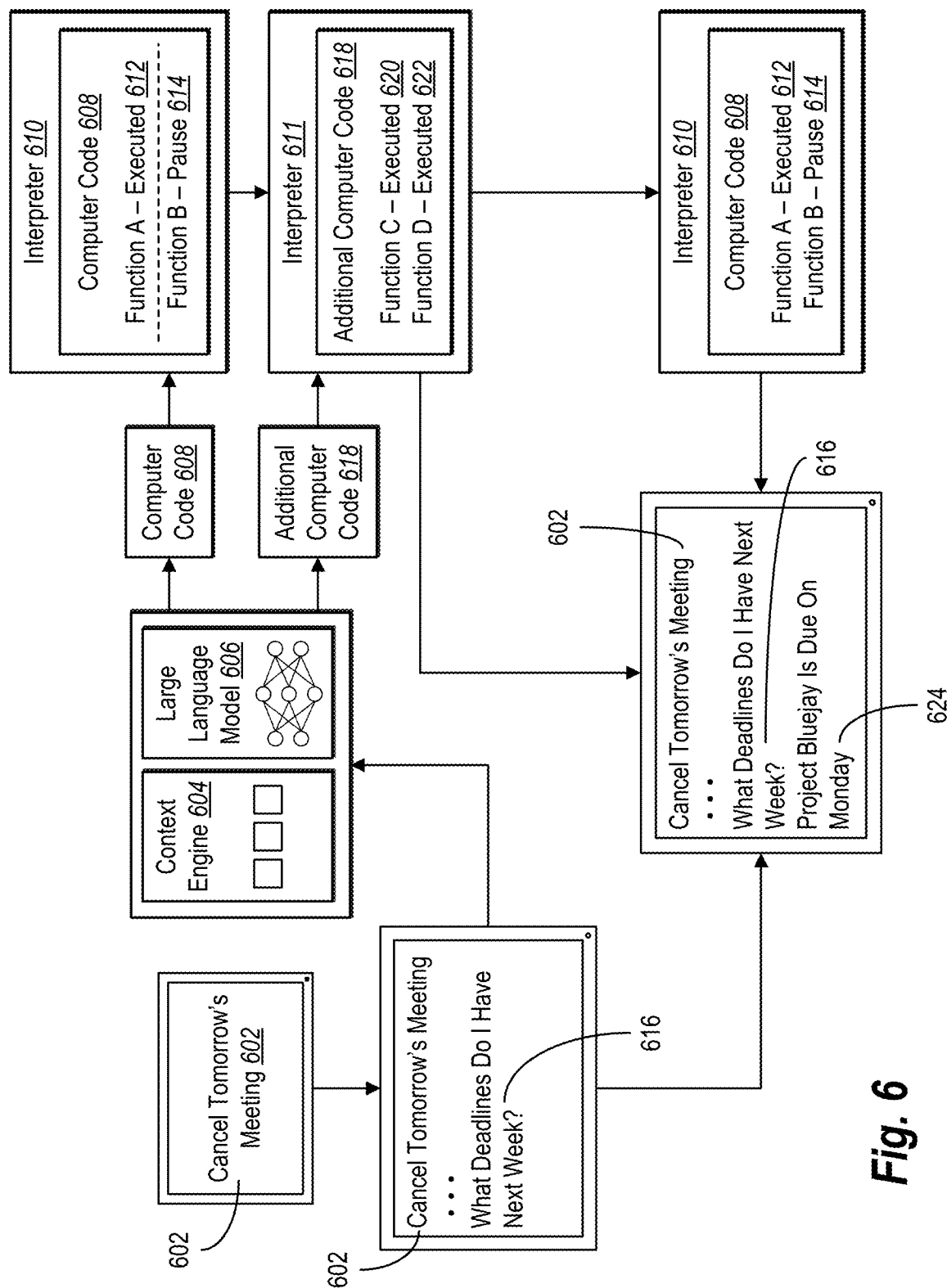
FIG. 6 illustrates an example diagram of the multi-turn interpreter system pausing and executing computer code for different user interaction contexts in accordance with one or more embodiments.

As just discussed, the multi-turn interpreter system 100 can generate a serialized state of an interpreter to resume execution of the computer code when the interpreter encounters an interruption event and pauses execution of the computer code. In some cases, the interpreter can pause the execution of the computer code for an initial query by receiving an additional query with a different context. FIG. 6 illustrates an example diagram of the multi-turn interpreter system pausing and executing computer code for different user interaction contexts in accordance with one or more embodiments.

In some cases, the multi-turn interpreter system 100 can receive multiple queries during a multi-turn interaction. In one or more cases, the multi-turn interpreter system 100 can pause the execution of computer code 608 and serialize the state of a first instance of an interpreter 610 for a first interaction context associated with a first query 602 based on receiving an additional query 616 with a second interaction context that differs from the first interaction context and that acts as an interruption event.

As shown in FIG. 6 and as discussed above, the multi-turn interpreter system 100 can receive a first query 602 that reads "Cancel tomorrow's meeting." As discussed above, the multi-turn interpreter system 100 can utilize a context engine 604 and a large language model 606 to generate computer code 608 that corresponds to the first query 602. In one or more cases, the multi-turn interpreter system 100 can determine a first interaction context based on the theme, topic, and/or task associated with the first query 602 (or first user interaction received from a client device). As shown in FIG. 6, the multi-turn interpreter system 100 can process the computer code 608 comprising a function A 612 and a function B 614 with the first instance of the interpreter 610.

In some cases, the multi-turn interpreter system 100 can receive an additional query 616 that interrupts the processing of the computer code 608 because a second interaction context (e.g., theme, topic, task, etc.) of the additional query 616 differs from the first interaction context. For example, the additional query 616 reads "What deadlines do I have next week?" and the multi-turn interpreter system 100 will have to generate additional computer code 618 that differs from the computer code 608 to generate a response about next week's deadlines.

As shown in FIG. 6, the multi-turn interpreter system 100 can pause the processing of the computer code 608 based on detecting the interruption event (e.g., the additional query 616) that initiates the second interaction context. For example, FIG. 6 shows the interpreter pausing the execution of function B 614 in the computer code 608. As described above, the multi-turn interpreter system 100 can generate a serialized state of the first instance of the interpreter 610 for the first interaction context.

As further shown in FIG. 6, the multi-turn interpreter system 100 can receive the additional query 616. In some cases, the multi-turn interpreter system 100 detects the additional query 616 and the second interaction context that differs from the first interaction context indicates the client device left the first interaction context. As described above, the multi-turn interpreter system 100 can utilize the context engine 604 and the large language model 606 to generate additional computer code 618 for the additional query and second interaction context. As shown in FIG. 6, the additional computer code 618 can include a function C 620 and a function D 622 for determining deadlines for the user account for the next week. As FIG. 6 illustrates, a second instance of an interpreter 611 corresponding to the second interaction context can execute the additional computer code 618 and generate an additional response 624 that reads "Project Bluejay is due on Monday."

In some cases, the multi-turn interpreter system 100 can detect a return to the first interaction context from the client device. For example, the multi-turn interpreter system 100 can complete execution of the additional computer code 618 and based on the completion of the additional computer code 618, the multi-turn interpreter system 100 can detect the client device returning to the first interaction context. In some cases, the multi-turn interpreter system 100 can detect the return to the first interaction context based on the multi-turn interpreter system 100 receiving one or more follow-up queries related to the first query 602. In some cases, when the multi-turn interpreter system 100 detects the return to the first interaction context, the multi-turn interpreter system 100 can resume execution of the computer code 608 by the first instance of the interpreter 610 and cancel the meeting.

Figure 7:
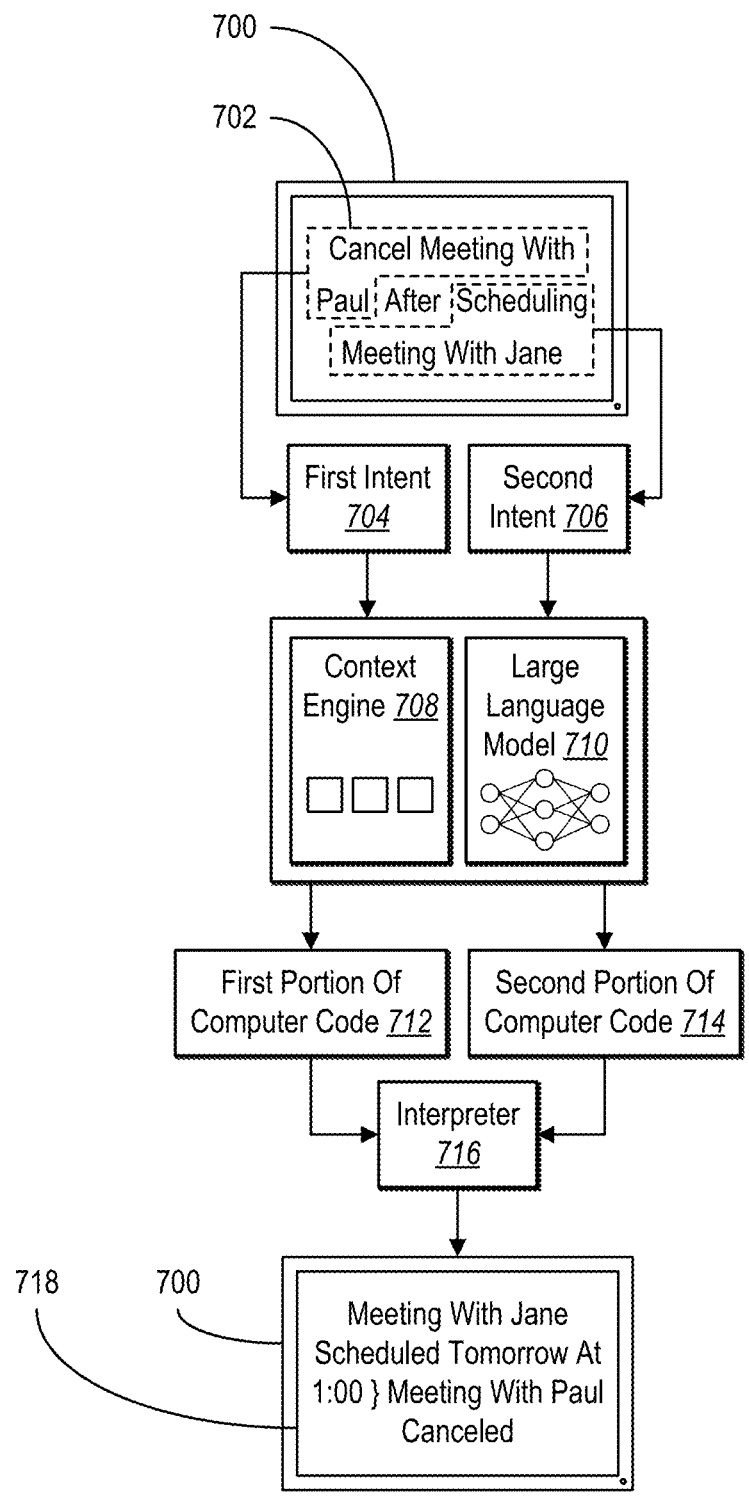
FIG. 7 illustrates an example diagram of the multi-turn interpreter system generating one or more responses for one or more intents within a query in accordance with one or more embodiments.

In some cases, the multi-turn interpreter system 100 can detect one or more intents within a query. In particular, the multi-turn interpreter system 100 can detect one or more unrelated tasks within a single query. In some cases, the multi-turn interpreter system 100 can breakdown and process the query based on the one or more intents within the query. FIG. 7 illustrates an example diagram of the multi-turn interpreter system generating one or more responses for one or more intents within a query in accordance with one or more embodiments.

As shown in FIG. 7, the multi-turn interpreter system 100 can receive a query 702 that reads "Cancel meeting with Paul after scheduling meeting with Jane." from a client device 700. As mentioned above, the multi-turn interpreter system 100 can detect within the query 702 a first intent 704 associated with a first task (e.g., cancelling the meeting with Paul) and a second intent 706 associated with a second task (e.g., scheduling the meeting with Jane). In some cases, the multi-turn interpreter system 100 can generate computer code according to the content or instructions of the query 702. For example, the multi-turn interpreter system 100 can generate a second portion of computer code 714 corresponding to the second intent 706 before generating a first portion of computer code 712 corresponding to the first intent 704 utilizing a context engine 708 and a large language model 710 as described above.

Relatedly, in one or more embodiments, the multi-turn interpreter system 100 can execute the second portion of computer code 714 with an interpreter 716 as described above before executing the first portion of computer code 712. In some cases, the multi-turn interpreter system 100 can determine an order to execute multiple portions of computer code corresponding to multiple intents within the query 702 based on how the intents relate to each other.

As FIG. 7 illustrates, the multi-turn interpreter system 100 can generate a response 718 that corresponds to the first intent 704 and the second intent 706. For example, the response 718 reading "Meeting with Jane scheduled tomorrow at 1:00 and meeting with Paul cancelled" addresses the tasks outlined in the query 702. In some cases, the multi-turn interpreter system 100 can generate separate responses for each intent. For example, the multi-turn interpreter system 100 can generate a second response corresponding to the second intent 706 and a first response corresponding to the first intent.

Figure 8:
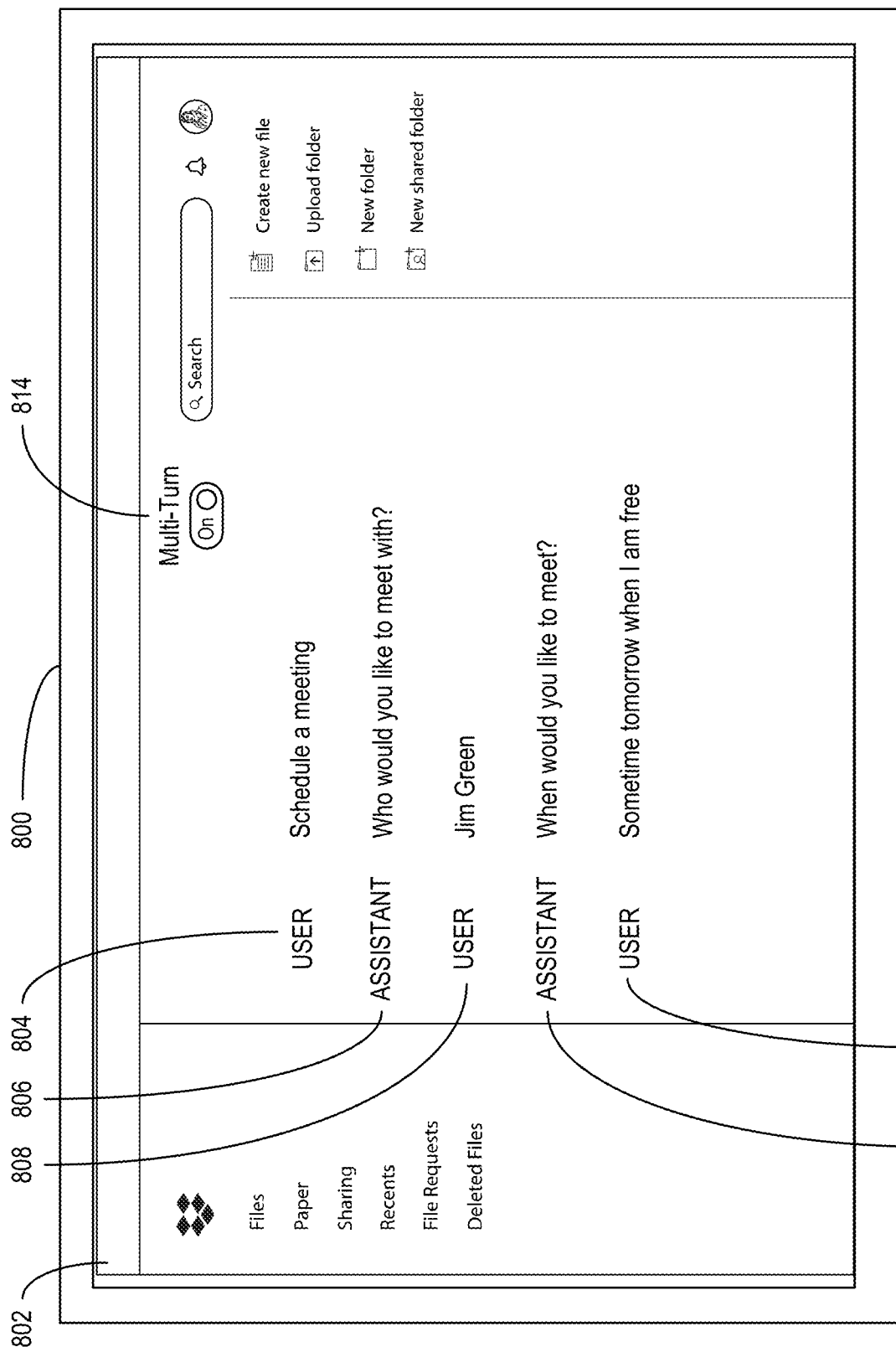
FIG. 8 illustrates an exemplary graphical user interface of one or more multi-turn interactions in accordance with one or more embodiments.

As discussed, the multi-turn interpreter system 100 can maintain the context of multi-turn interactions (or conversations). FIG. 8 shows the multi-turn interpreter system 100 operating within a graphical user interface in accordance with one or more embodiments. For example, FIG. 8 shows a client device 800 with a graphical user interface 802 (e.g., a DROPBOX homepage). Furthermore, FIG. 8 shows a first query 804 that reads "Schedule a meeting." In response to a user of the client device 800 inputting the first query 804 (or user interaction), the multi-turn interpreter system 100 utilizes the methods described above to generate a first supplemental request 806 (or message) that reads "Who would you like to meet with?" to determine data (or supplemental execution data) related to a first missing parameter for scheduling the meeting with an individual.

Moreover, FIG. 8 further shows the multi-turn interpreter system 100 receiving the data 808 (or supplemental execution data) from the client device that reads "Jim Green." As discussed above, the multi-turn interpreter system 100 utilizes the methods described above to generate a second supplemental request 810 that reads "When would you like to meet?" As shown the multi-turn interpreter system 100 can receive additional data 812 (or additional supplemental execution data) that reads "Sometime tomorrow when I am free." As described above, the multi-turn interpreter system 100 can utilize the additional data 812 to determine a parameter (or variable) related to a missing timeblock parameter. Accordingly, as shown in FIG. 8, the multi-turn interpreter system 100 can go back and forth with the client device 800 to request all of the information needed for scheduling the appointment. Indeed, the multi-turn interpreter system 100 can maintain the context of the multi-turn conversation to request relevant information without having to reprocess computer code.

As shown in FIG. 8, in one or more embodiments, the graphical user interface 802 can include a selectable multi-turn element 814 that enables or disables the multi-turn context mode. For example, as FIG. 8 illustrates, the selection of the selectable multi-turn element 814 can enable the multi-turn context mode for an instance with the context engine, large language model, and the interpreter. In particular, when the multi-turn interpreter system 100 enables the multi-turn context mode, the multi-turn interpreter system 100 can utilize the specialized analysis of the prompt and computer code to detect ambiguities or missing data within the computer data that triggers interruption events and generates serialized states of the interpreter. Alternatively, based on detecting a selection that disables the multi-turn context mode, the multi-turn interpreter system 100 can determine the context of multi-turn interactions using traditional context assistant methods.

FIGS. 1-8, the corresponding text, and the examples provide a number of different systems and methods for determining a multi-turn interaction context. In addition to the foregoing, implementations can also be described in terms of flowcharts comprising acts/steps in a method for accomplishing a particular result. For example, FIG. 9 illustrates an example series of acts performed by the multi-turn interpreter system in accordance with one or more embodiments.

Figure 9:
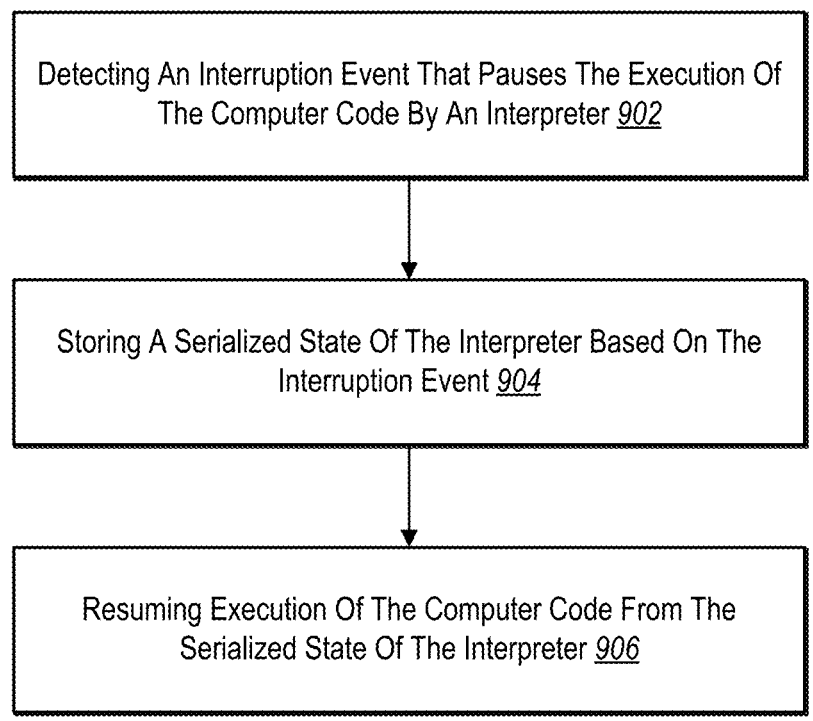
FIG. 9 illustrates an example series of acts performed by the multi-turn interpreter system in accordance with one or more embodiments.

While FIG. 9 illustrates acts according to certain implementations, alternative implementations may omit, add to, reorder, and/or modify any of the acts shown in FIG. 9. The acts of FIG. 9 can be performed as part of a method. Alternatively, a non-transitory computer-readable medium can comprise instructions, that when executed by one or more processors, cause a computing device to perform the acts of FIG. 9. In still further implementations, a system can perform the acts of FIG. 9.

As illustrated in FIG. 9, a series of acts 900 may include an act 902 of detecting an interruption event that pauses the execution of the computer code by an interpreter, an act 904 of storing a serialized stat of the interpreter based on the interruption event, an act 906 of resuming execution of the computer code from the serialized state of the interpreter.

In particular the act 902 includes detecting, during execution of computer code by an interpreter of a context engine communicating with a large language model, an interruption event that pauses the execution of the computer code by the interpreter. Further, the act 904 includes storing, based on the interruption event, a serialized state of the interpreter that encodes code execution data indicating a pause location in the computer code. Moreover, the act 906 includes resuming execution of the computer code by the interpreter from the serialized state.

In some implementations, the series of acts 900 can include determining, from the serialized state of the interpreter, supplemental execution data for resuming execution of the computer code. Further, in one or more embodiments, the series of acts 900 includes generating the serialized state of the interpreter by generating a computer code segment indicating the interruption event and the pause location where execution of the computer code paused due to the interruption event. Additionally, in one or more embodiments, the series of acts 900 includes determining the supplemental execution data by generating, for the computer code, supplemental computer code that facilitates resuming execution of the computer code from the serialized state.

Moreover, in one or more embodiments, the series of acts 900 includes detecting the interruption event by detecting one or more missing parameters for the execution of the computer code. Furthermore, in one or more embodiments, the series of acts 900 includes generating the serialized state by generating a computer code segment defining the one or more missing parameters. Additionally, in one or more embodiments, the series of acts 900 includes determining supplemental execution data by generating, utilizing the large language model associated with the context engine, a supplemental request requesting data related to the one or more missing parameters.

Moreover, in one or more embodiments, the series of acts 900 includes receiving, in a first interaction context, a query from a client device associated with a user account. Further, in one or more embodiments, the series of acts 900 includes generating, based on the query of the first interaction context, the computer code utilizing the large language model communicating with the context engine. Moreover, in one or more embodiments, the series of acts 900 includes detecting the interruption event that pauses execution of the computer code by detecting an additional query from the client device initiating a second interaction context different from the first interaction context. Further, in one or more embodiments, the series of acts 900 includes resuming execution of the computer code based on detecting a return to the first interaction context from the client device.

Moreover, in one or more embodiments, the series of acts 900 includes generating, utilizing the context engine to process a query received from a client device and for providing a large language model, a prompt comprising computer code instructions for the large language model to retrieve a content item related to the query.

Additionally, in one or more embodiments, the series of acts 900 includes in receiving a query from a client device associated with a user account. Moreover, in one or more embodiments, the series of acts 900 includes generating, utilizing the context engine to process the query, a prompt comprising the query together with one or more multi-turn examples instructing the large language model to generate the computer code for the interpreter in a multi-turn context. Further, in one or more embodiments, the series of acts 900 includes generating the computer code by processing the prompt with the large language model.

Additionally, in one or more embodiments, the series of acts 900 includes modifying the computer code of the interpreter by adding supplemental execution data to the computer code.

Moreover, in one or more embodiments, the series of acts 900 includes detecting, during execution of computer code by an interpreter of a context engine associated with a content management system, an interruption event that pauses the execution of the computer code by the interpreter. Further, in one or more embodiments, the series of acts 900 includes storing within a database of the content management system, based on the interruption event, a serialized state of the interpreter that encodes code execution data indicating a pause location in the computer code. Furthermore, in one or more embodiments, the series of acts 900 includes resuming execution of the computer code by the interpreter from the serialized state.

Moreover, in one or more embodiments, the series of acts 900 includes detecting the interruption event by determining an ambiguity in the computer code. Further, in one or more embodiments, the series of acts 900 includes generating a supplemental request requesting clarification data related to the ambiguity. Moreover, in one or more embodiments, the series of acts 900 includes generating supplemental execution data from the clarification data related to the ambiguity.

Moreover, in one or more embodiments, the series of acts 900 includes identifying, for a query received from a client device, a first intent within the query and a second intent within the query. Further, in one or more embodiments, the series of acts 900 includes generating a first portion of computer code for the first intent and a second portion of computer code for the second intent. Further, in one or more embodiments, the series of acts 900 includes executing, by utilizing the interpreter, the first portion of computer code and the second portion of computer code. Moreover, in one or more embodiments, the series of acts 900 includes generating, based on executing the first portion and the second portion using the interpreter, a first response to the first intent within the query and a second response to the second intent within the query.

Moreover, in one or more embodiments, the series of acts 900 includes receiving a query from a client device associated with a user account. Further, in one or more embodiments, the series of acts 900 includes modifying, utilizing the context engine, a prompt associated with the query by adding one or more functions instructing a large language model to retrieve one or more content items related to the query.

Further, in one or more embodiments, the series of acts 900 includes generating, utilizing the context engine, a prompt comprising one or more multi-turn examples instructing a large language model to generate the computer code for the interpreter in a multi-turn context. Furthermore, in one or more embodiments, the series of acts 900 includes generating, via the large language model, the computer code based on the one or more multi-turn examples.

Moreover, in one or more embodiments, the series of acts 900 includes generating the serialized state of the interpreter by generating a data object defining the pause location in the computer code.

Further, in one or more embodiments, the series of acts 900 includes generating modified computer code of the interpreter by adding supplemental execution data to the computer code. Moreover, in one or more embodiments, the series of acts 900 includes based on adding the supplemental execution data, resuming execution of the modified computer code by the interpreter from the serialized state.

Moreover, in one or more embodiments, the series of acts 900 includes detecting, during execution of computer code by an interpreter of a context engine, an interruption event that pauses the execution of the computer code by the interpreter. Further, in one or more embodiments, the series of acts 900 includes storing, based on the interruption event, a serialized state of the interpreter that encodes code execution data indicating a pause location in the computer code. Moreover, in one or more embodiments, the series of acts 900 includes resuming execution of the computer code by the interpreter from the serialized state a. Further, in one or more embodiments, the series of acts 900 includes generating a response by utilizing the interpreter to complete execution of the computer code.

In some implementations, the series of acts 900 includes determining the pause location in the computer code. Moreover, the series of acts 900 can include generating the serialized state of the interpreter by generating a computer code segment indicating the interruption event and the pause location where execution of the computer code paused due to the interruption event.

Furthermore, in one or more embodiments, the series of acts 900 includes receiving a query from a client device. In some implementations, the series of acts 900 includes generating, utilizing a large language model, one or more functions for retrieving one or more content items related to the query. Additionally, the series of acts 900 can include modifying, utilizing the context engine, a prompt corresponding to the query by adding the one or more functions to the prompt.

Further, the series of acts 900 can include generating, via a large language model, the computer code based on one or more multi-turn examples.

Moreover, the series of acts 900 includes an act where the interruption event pausing execution of the computer code comprises: writing one or more operations on a third-party application.

Moreover, in some cases, the series of acts 900 includes identifying, for a query received from a client device, a first intent within a query and a second intent within a query. Additionally, the series of acts 900 includes generating a first portion of computer code for the first intent and a second portion of computer code for the second intent. In one or more cases, the series of acts 900 includes executing, by utilizing the interpreter, the first portion of computer code and the second portion of computer code. Additionally, in one or more implementations, the series of acts 900 can include generating, based on executing the first portion and the second portion using the interpreter, a first response to the first intent within the query and a second response to the second intent within the query. Further, the series of acts 900 can include providing for display on a client device, the first response and the second response.

Figure 10:
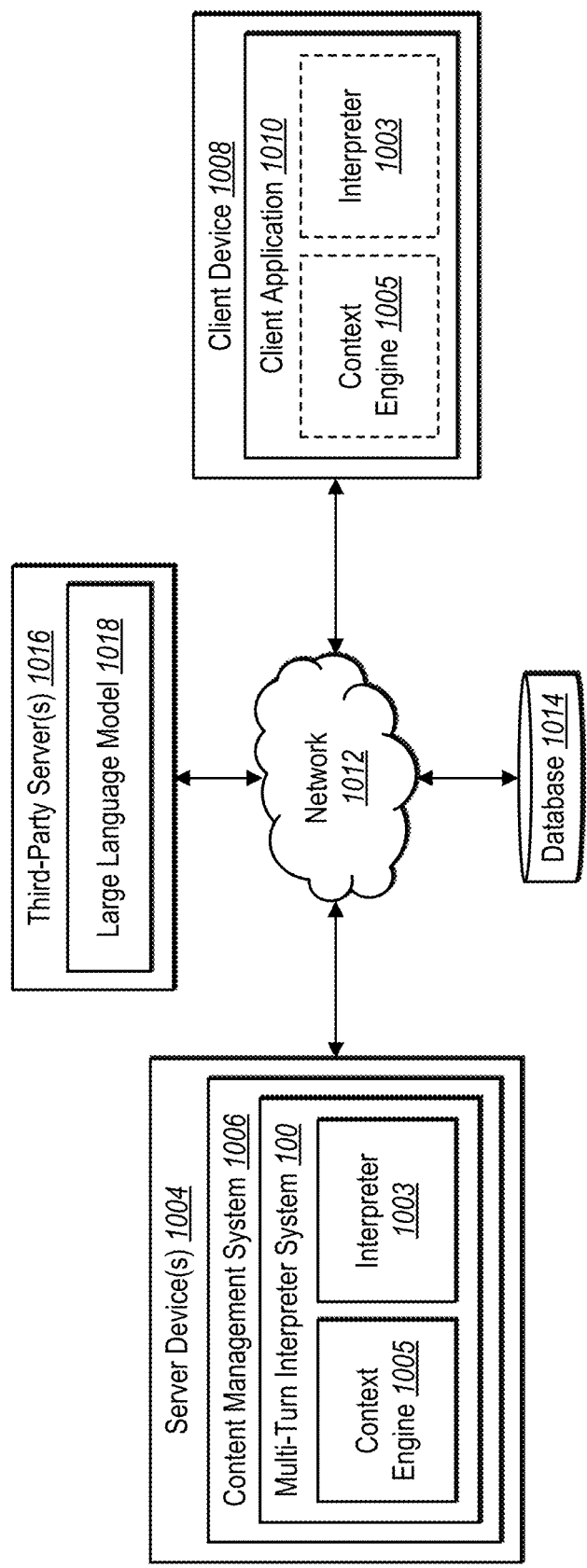
FIG. 10 illustrates a schematic diagram of an example environment of a multi-turn interpreter system in accordance with one or more embodiments.

Additional detail regarding the multi-turn interpreter system will now be provided with reference to the figures. For example, FIG. 10 illustrates a schematic diagram of an example system environment for implementing a multi-turn interpreter system 100 in accordance with one or more implementations. An overview of the multi-turn interpreter system 100 is described in relation to FIG. 10. Thereafter, a more detailed description of the components and processes of the multi-turn interpreter system 100 is provided in relation to the subsequent figures.

As shown, the environment includes server(s) 1004 with the multi-turn interpreter system 100 that includes a context engine 1005, which further includes an interpreter 1003, a database 1014, server(s) 1016, and a client device 1008. Each of the components of the environment can communicate via the network 1012, and the network 1012 may be any suitable network over which computing devices can communicate. Example networks are discussed in more detail below in relation to FIGS. 11-12.

As mentioned above, the example environment includes client device 1008. The client device 1008 can be one of a variety of computing devices, including a smartphone, a tablet, a smart television, a desktop computer, a laptop computer, a virtual reality device, an augmented reality device, or another computing device as described in relation to FIGS. 11-12. The client device 1008 can communicate with the server(s) 1004 via the network 1012. For example, the client device 1008 can receive user input from a user interacting with the client device 1008 (e.g., via the client application 1010) to, for instance, generate supplemental execution data, clarification data, data related to a missing parameter, or to select user interface elements for interacting with the content management system 1006. In addition, the multi-turn interpreter system 100 on the server(s) 1004 can receive information relating to various interactions with content items and/or user interface elements based on the input received by the client device 1008.

As shown, the client device 1008 can include a client application 1010. In particular, the client application 1010 may be a web application, a native application installed on the client device 1008 (e.g., a mobile application, a desktop application, etc.), or a cloud-based application where all or part of the functionality is performed by the server(s) 1004. Based on instructions from the client application 1010, the client device 1008 can present or display information, including a user interface for interacting with (or collaborating regarding) generating responses for a query in multi-turn interactions. Using the client application, the client device 1008 can perform (or request to perform) various operations, such as pausing the execution of computer code by an interpreter and/or generating a response to a text query.

As illustrated in FIG. 10, the example environment also includes the server(s) 1004. The server(s) 1004 may generate, track, store, process, receive, and transmit electronic data, such as text queries, a serialized state of an interpreter, computer code, interactions with interface elements, and/or interactions between user accounts or client devices. For example, the server(s) 1004 may receive an indication from the client device 1008 of a user interaction defining a text query. In addition, the server(s) 1004 can transmit data to the client device 1008 in the form of a response to a text query. Indeed, the server(s) 1004 can communicate with the client device 1008 to send and/or receive data via the network 1012. In some implementations, the server(s) 1004 comprise(s) a distributed server where the server(s) 1004 include(s) a number of server devices distributed across the network 1012 and located in different physical locations. The server(s) 1004 can comprise one or more content servers, application servers, container orchestration servers, communication servers, web-hosting servers, machine learning server, and other types of servers.

As shown in FIG. 10, the server(s) 1004 can also include the multi-turn interpreter system 100 as part of a content management system 1006. The content management system 1006 can communicate with the client device 1008 to perform various functions associated with the client application 1010 such as managing user accounts, defining text queries, and/or requesting clarification data for an ambiguity in the computer code. Indeed, the content management system 1006 can include a network-based smart cloud storage system to manage, store, and maintain content items and related data across numerous user accounts. In some embodiments, the multi-turn interpreter system 100 and/or the content management system 1006 utilize the database 1014 to store and access information such as content items, clarification data, data relating to a missing parameter, supplemental execution data, data objects, computer code segments, computer code, prompts, text queries, results for text queries, responses to text queries, a serialized state of the interpreter 1003, and other information related to a state of the interpreter 1003.

As further illustrated, the environment includes the server(s) 1016 that hosts a large language model 1018. In particular, the large language model 1018 communicates with the server(s) 1004, the client device 1008, and/or the database 1014. For example, the multi-turn interpreter system 100 provides domain-specific language segments to the large language model 1018, where the domain-specific language segments indicate a context of multi-turn interactions. Indeed, the large language model 1018 can include a machine learning model powered by neural networks or other machine learning architectures for generating responses to text queries. For example, the large language model 1018 can refer to a ChatGPT model that generates computer-executable code segments for accessing contextual data sources to generate responses for query subcomponents.

Although FIG. 10 depicts the multi-turn interpreter system 100 located on the server(s) 1004, in some implementations, the multi-turn interpreter system 100 may be implemented by (e.g., located entirely or in part on) one or more other components of the environment. For example, the multi-turn interpreter system 100 may be implemented by the client device 1008 and/or a third-party system. For example, the client device 1008 and/or a third-party system can download all or part of the multi-turn interpreter system 100 for implementation independent of, or together with, the server(s) 1004.

In some implementations, though not illustrated in FIG. 10, the environment may have a different arrangement of components and/or may have a different number or set of components altogether. For example, the client device 1008 may communicate directly with the multi-turn interpreter system 100, bypassing the network 1012. In addition, the environment can include the database 1014 located external to the server(s) 1004 (e.g., in communication via the network 1012) or located on the server(s) 1004 and/or on the client device 1008. In some cases, the server(s) 1004 and/or the client device 1008 can host or house all or part of the large language model 1018.

The components of the multi-turn interpreter system 100 can include software, hardware, or both. For example, the components of the multi-turn interpreter system 100 can include one or more instructions stored on a computer-readable storage medium and executable by processors of one or more computing devices. When executed by one or more processors, the computer-executable instructions of the multi-turn interpreter system 100 can cause a computing device to perform the methods described herein. Alternatively, the components of the multi-turn interpreter system 100 can comprise hardware, such as a special purpose processing device to perform a certain function or group of functions. Additionally or alternatively, the components of the multi-turn interpreter system 100 can include a combination of computer-executable instructions and hardware.

Furthermore, the components of the multi-turn interpreter system 100 performing the functions described herein may, for example, be implemented as part of a stand-alone application, as a module of an application, as a plug-in for applications including content management applications, as a library function or functions that may be called by other applications, and/or as a cloud-computing model. Thus, the components of the multi-turn interpreter system 100 may be implemented as part of a stand-alone application on a personal computing device or a mobile device.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
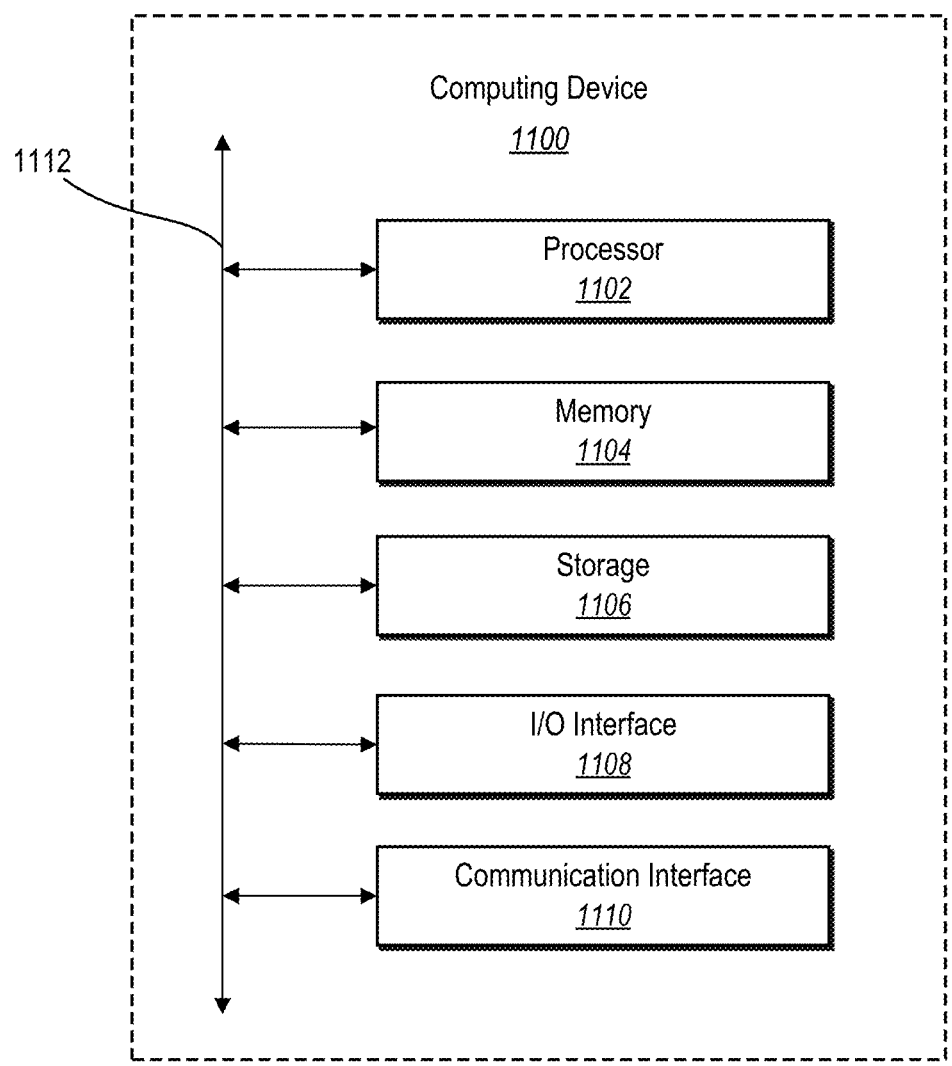
FIG. 11 illustrates a block diagram of an exemplary computing device in accordance with one or more embodiments.

FIG. 11 illustrates a block diagram of exemplary computing device 1100 (e.g., the server(s) 1004, the server(s) 1016, and/or the client device 1008) that may be configured to perform one or more of the processes described above. One will appreciate that server(s) 1004 and/or the client device 1008 may comprise one or more computing devices such as computing device 1100. As shown by FIG. 11, computing device 1100 can comprise processor 1102, memory 1104, storage device 1106, I/O interface 1108, and communication interface 1110, which may be communicatively coupled by way of communication infrastructure 1112. While an exemplary computing device 1100 is shown in FIG. 11, the components illustrated in FIG. 11 are not intended to be limiting. Additional or alternative components may be used in other implementations. Furthermore, in certain implementations, computing device 1100 can include fewer components than those shown in FIG. 11. Components of computing device 1100 shown in FIG. 11 will now be described in additional detail.

In particular implementations, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage device 1106 and decode and execute them. In particular implementations, processor 1102 may include one or more internal caches for data, instructions, or addresses. As an example and not by way of limitation, processor 1102 may include one or more instruction caches, one or more data caches, and one or more translation lookaside buffers (TLBs). Instructions in the instruction caches may be copies of instructions in memory 1104 or storage device 1106.

Memory 1104 may be used for storing data, metadata, and programs for execution by the processor(s). Memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1104 may be internal or distributed memory.

Storage device 1106 includes storage for storing data or instructions. As an example and not by way of limitation, storage device 1106 can comprise a non-transitory storage medium described above. Storage device 1106 may include a hard disk drive (HDD), a floppy disk drive, flash memory, an optical disc, a magneto-optical disc, magnetic tape, or a Universal Serial Bus (USB) drive or a combination of two or more of these. Storage device 1106 may include removable or non-removable (or fixed) media, where appropriate. Storage device 1106 may be internal or external to computing device 1100. In particular implementations, storage device 1106 is non-volatile, solid-state memory. In other implementations, Storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1108 allows a user to provide input to, receive output from, and otherwise transfer data to and receive data from computing device 1100. I/O interface 1108 may include a mouse, a keypad or a keyboard, a touch screen, a camera, an optical scanner, network interface, modem, other known I/O devices or a combination of such I/O interfaces. I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1108 is configured to provide graphical data to a display for presentation to a user. The graphical data may be representative of one or more graphical user interfaces and/or any other graphical content as may serve a particular implementation.

Communication interface 1110 can include hardware, software, or both. In any event, communication interface 1110 can provide one or more interfaces for communication (such as, for example, packet-based communication) between computing device 1100 and one or more other computing devices or networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1112 may include hardware, software, or both that couples components of computing device 1100 to each other. As an example and not by way of limitation, communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 12:
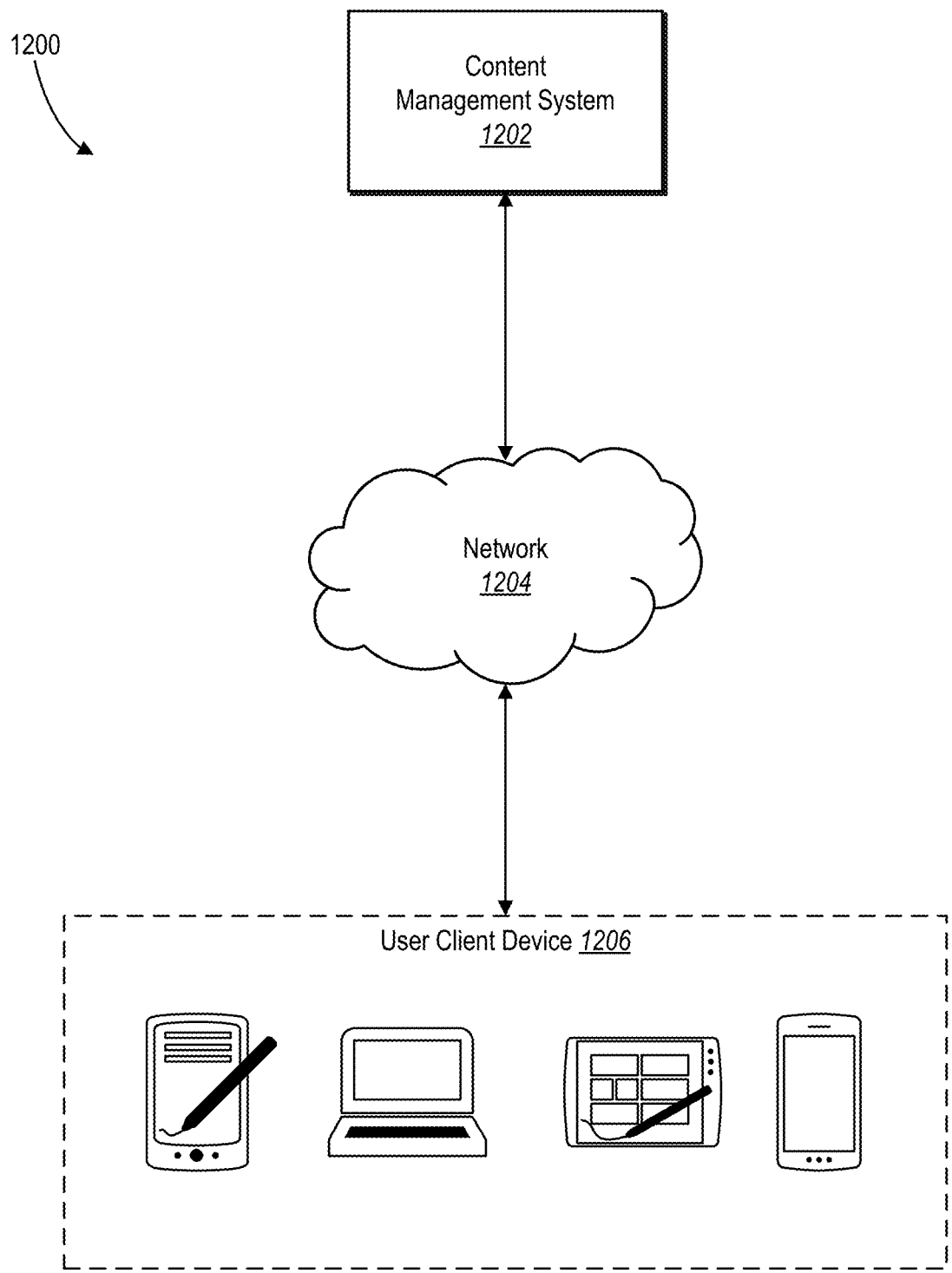
FIG. 12 illustrates an example environment of a networking system having the multi-turn interpreter system in accordance with one or more embodiments.

FIG. 12 is a schematic diagram illustrating environment 1200 within which one or more implementations of the multi-turn interpreter system 100 can be implemented. For example, the multi-turn interpreter system 100 may be part of a content management system 1202 (e.g., the content management system 1006). Content management system 1202 may generate, store, manage, receive, and send digital content (such as digital content items). For example, content management system 1202 may send and receive digital content to and from client device of client devices 1206 by way of network 1204. In particular, content management system 1202 can store and manage a collection of digital content. Content management system 1202 can manage the sharing of digital content between computing devices associated with a plurality of users. For instance, content management system 1202 can facilitate a user sharing a digital content with another user of content management system 1202.

In particular, content management system 1202 can manage synchronizing digital content across multiple client devices 1206 associated with one or more users. For example, a user may edit digital content using a client device of the client device 1206. The content management system 1202 can cause client device of the client devices 1206 to send the edited digital content to content management system 1202. Content management system 1202 then synchronizes the edited digital content on one or more additional computing devices.

In addition to synchronizing digital content across multiple devices, one or more implementations of content management system 1202 can provide an efficient storage option for users that have large collections of digital content. For example, content management system 1202 can store a collection of digital content on content management system 1202, while the client device of the client devices 1206 only stores reduced-sized versions of the digital content. A user can navigate and browse the reduced-sized versions (e.g., a thumbnail of a digital image) of the digital content on client device of the client devices 1206. In particular, one way in which a user can experience digital content is to browse the reduced-sized versions of the digital content on client device of client devices 1206.

Another way in which a user can experience digital content is to select a reduced-size version of digital content to request the full- or high-resolution version of digital content from content management system 1202. In particular, upon a user selecting a reduced-sized version of digital content, client device of client devices 1406 sends a request to content management system 1202 requesting the digital content associated with the reduced-sized version of the digital content. Content management system 1202 can respond to the request by sending the digital content to client device of client devices 1206. Client device of client devices 1206, upon receiving the digital content, can then present the digital content to the user. In this way, a user can have access to large collections of digital content while minimizing the amount of resources used on client device of client devices 1206.

client device of client devices 1206 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. client device of client devices 1206 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1204.

Network 1204 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client device of client devices 1206 may access content management system 1202.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed:

1. A computer-implemented method comprising:
   detecting, during execution of computer code by an interpreter of a context engine communicating with a large language model, an interruption event that pauses the execution of the computer code by the interpreter, wherein the interruption event involves detecting one or more missing parameters for execution of the computer code;
   generating a serialized state by generating a computer code segment defining the one or more missing parameters;
   storing, based on the interruption event, the serialized state of the interpreter that encodes code execution data indicating a pause location in the computer code; and
   resuming execution of the computer code by the interpreter from the serialized state based on receiving a supplemental request requesting supplemental execution data related to the one or more missing parameters.

2. The computer-implemented method of claim 1, further comprising:
   determining, from the serialized state of the interpreter, supplemental execution data for resuming execution of the computer code;
   generating the serialized state of the interpreter by generating a computer code segment indicating the interruption event and the pause location where execution of the computer code paused due to the interruption event; and
   determining the supplemental execution data by generating, for the computer code, supplemental computer code that facilitates resuming execution of the computer code from the serialized state.

3. The computer-implemented method of claim 1, further comprising:
   generating modified computer code based on adding the supplemental execution data related to the one or more missing parameters to the computer code; and
   resuming execution of the computer code by executing the modified computer code at the pause location.

4. The computer-implemented method of claim 1, further comprising:
   receiving, in a first interaction context, a query from a client device associated with a user account;
   generating, based on the query of the first interaction context, the computer code utilizing the large language model communicating with the context engine;
   detecting the interruption event that pauses execution of the computer code by detecting an additional query from the client device initiating a second interaction context different from the first interaction context; and
   resuming execution of the computer code based on detecting a return to the first interaction context from the client device.

5. The computer-implemented method of claim 1, further comprising:
   generating, utilizing the context engine to process a query received from a client device and for providing a large language model, a prompt comprising computer code instructions for the large language model to retrieve a content item related to the query.

6. The computer-implemented method of claim 1, further comprising:
   receiving a query from a client device associated with a user account;
   generating, utilizing the context engine to process the query, a prompt comprising the query together with one or more multi-turn examples instructing the large language model to generate the computer code for the interpreter in a multi-turn context; and
   generating the computer code by processing the prompt with the large language model.

7. The computer-implemented method of claim 1, further comprising:
   modifying the computer code of the interpreter by adding supplemental execution data to the computer code.

8. A system comprising:
   at least one processor; and
   a non-transitory computer-readable medium storing instructions which, when executed by the at least one processor, cause the system to:
   receive a query from a client device, wherein the query corresponds to an initial context;
   detect, during execution of computer code by an interpreter of a context engine associated with a content management system, an interruption event that pauses the execution of the computer code by the interpreter, wherein the interruption event involves detecting an intervening query from the client device that involves an additional context that differs from the initial context of the query;
   store within a database of the content management system, based on the interruption event, a serialized state of the interpreter that encodes code execution data indicating a pause location in the computer code; and
   resume execution of the computer code by the interpreter from the serialized state based on detecting a return to the initial context from the client device.

9. The system of claim 8, further storing instructions which, when executed by the at least one processor, cause the system to:
   detect the interruption event by determining an ambiguity in the computer code;
   generate a supplemental request requesting clarification data related to the ambiguity; and
   generate supplemental execution data from the clarification data related to the ambiguity.

10. The system of claim 8, further storing instructions which, when executed by the at least one processor, cause the system to:
    identify, for a query received from a client device, a first intent within the query and a second intent within the query;
    generate a first portion of computer code for the first intent and a second portion of computer code for the second intent;
    execute, by utilizing the interpreter, the first portion of computer code and the second portion of computer code; and
    generate, based on executing the first portion and the second portion using the interpreter, a first response to the first intent within the query and a second response to the second intent within the query.

11. The system of claim 8, further storing instructions which, when executed by the at least one processor, cause the system to:
    receive a query from a client device associated with a user account, and
    modify, utilizing the context engine, a prompt associated with the query by adding one or more functions instructing a large language model to retrieve one or more content items related to the query.

12. The system of claim 8, further storing instructions which, when executed by the at least one processor, cause the system to:
    generate, utilizing the context engine, a prompt comprising one or more multi-turn examples instructing a large language model to generate the computer code for the interpreter in a multi-turn context; and
    generate, via the large language model, the computer code based on the one or more multi-turn examples.

13. The system of claim 8, further storing instructions which, when executed by the at least one processor, cause the system to generate the serialized state of the interpreter by generating a data object defining the pause location in the computer code.

14. The system of claim 8, further storing instructions which, when executed by the at least one processor, cause the system to:
    generate modified computer code of the interpreter by adding supplemental execution data to the computer code; and based on adding the supplemental execution data, resume execution of the modified computer code by the interpreter from the serialized state.

15. A non-transitory computer-readable medium storing executable instructions which, when executed by at least one processor, cause the at least one processor to:
  detect, during execution of computer code by an interpreter of a context engine, an interruption event that pauses the execution of the computer code by the interpreter, wherein the interruption event comprises the interpreter encountering a default parameter representing at least one of a missing parameter, an ambiguity, or a writing operation within the computer code;
  store, based on the interruption event, a serialized state of the interpreter that encodes code execution data indicating a pause location in the computer code;
  resume execution of the computer code by the interpreter from the serialized state based on receiving supplemental execution data related to the default parameter; and
  generate a response by utilizing the interpreter to complete execution of the computer code.

16. The non-transitory computer-readable medium of claim 15, further storing instructions which, when executed by the at least one processor, cause the at least one processor to:
  determine the pause location in the computer code; and
  generate the serialized state of the interpreter by generating a computer code segment indicating the interruption event and the pause location where execution of the computer code paused due to the interruption event.

17. The non-transitory computer-readable medium of claim 15, further storing instructions which, when executed by the at least one processor, cause the at least one processor to:
  receive a query from a client device;
  generate, utilizing a large language model, one or more functions for retrieving one or more content items related to the query; and
  modify, utilizing the context engine, a prompt corresponding to the query by adding the one or more functions to the prompt.

18. The non-transitory computer-readable medium of claim 15, further storing instructions which, when executed by the at least one processor, cause the at least one processor to:
  generate, via a large language model, the computer code based on one or more multi-turn examples.

19. The non-transitory computer-readable medium of claim 15, further storing instructions which, when executed by the at least one processor, cause the at least one processor to:
  generate modified computer code based on adding the supplemental execution data to the computer code; and
  resume execution of the computer code by executing the modified computer code at the pause location.

20. The non-transitory computer-readable medium of claim 15, further storing instructions which, when executed by the at least one processor, cause the at least one processor to:
  identify, for a query received from a client device, a first intent within a query and a second intent within a query;
  generate a first portion of computer code for the first intent and a second portion of computer code for the second intent;
  execute, by utilizing the interpreter, the first portion of computer code and the second portion of computer code;
  generate, based on executing the first portion and the second portion using the interpreter, a first response to the first intent within the query and a second response to the second intent within the query; and
  provide for display on a client device, the first response and the second response.

* * * * *